(12) United States Patent
Noda et al.

(10) Patent No.: US 11,599,812 B2
(45) Date of Patent: Mar. 7, 2023

(54) CONDITION DETERMINATION SYSTEM, CONDITION DETERMINATION METHOD, DECISION-MAKING SUPPORT SYSTEM, COMPUTER PROGRAM, AND STORAGE MEDIUM

(71) Applicant: MITSUBISHI HEAVY INDUSTRIES, LTD., Tokyo (JP)

(72) Inventors: Eisuke Noda, Tokyo (JP); Satoshi Hanada, Tokyo (JP); Yusuke Yamada, Tokyo (JP); Mizuki Kasamatsu, Tokyo (JP); Takae Yamashita, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1279 days.

(21) Appl. No.: 15/562,573

(22) PCT Filed: Mar. 25, 2016

(86) PCT No.: PCT/JP2016/059696
§ 371 (c)(1),
(2) Date: Sep. 28, 2017

(87) PCT Pub. No.: WO2016/158783
PCT Pub. Date: Oct. 6, 2016

(65) Prior Publication Data
US 2018/0107934 A1 Apr. 19, 2018

(30) Foreign Application Priority Data

Mar. 31, 2015 (JP) .............................. JP2015-073944
Mar. 31, 2015 (JP) .............................. JP2015-073947

(51) Int. Cl.
*G06N 5/04* (2006.01)
*G06N 5/045* (2023.01)
(Continued)

(52) U.S. Cl.
CPC .......... *G06N 5/045* (2013.01); *G05B 19/418* (2013.01); *G05B 23/0272* (2013.01);
(Continued)

(58) Field of Classification Search
CPC .. G06N 5/045; G05B 19/418; G05B 23/0272; G05B 19/0428; H02J 13/00;
(Continued)

(56) References Cited

U.S. PATENT DOCUMENTS 8,839,028 B1 * 9/2014 Polia .................... G06F 11/1088
714/6.24
9,944,404 B1 * 4/2018 Gentry .................. G01M 17/00
(Continued)

FOREIGN PATENT DOCUMENTS

EP    0626697 A1    5/1994
EP    0849693 A2    6/1998
(Continued)

OTHER PUBLICATIONS

International Search Report in PCT/JP2016/059696, dated May 24, 2016. 4pp.
(Continued)

*Primary Examiner* — Omar F Fernandez Rivas
*Assistant Examiner* — Tri T Nguyen
(74) *Attorney, Agent, or Firm* — Hauptman Ham, LLP

(57) ABSTRACT

A condition determination system includes: an operation condition data obtaining unit that obtains operation condition data indicating an operation condition of a facility; and a determination unit that determines, based on the operation condition data, a level of a phenomenon that occurs due to the operation condition of the facility.

10 Claims, 18 Drawing Sheets

(51) Int. Cl.
| | |
|---|---|
| *G05B 19/418* | (2006.01) |
| *H02J 13/00* | (2006.01) |
| *G06Q 10/0631* | (2023.01) |
| *G06Q 10/0635* | (2023.01) |
| *G05B 23/02* | (2006.01) |
| *H02J 7/00* | (2006.01) |
| *G06Q 50/06* | (2012.01) |
| *G21D 3/08* | (2006.01) |
| *G05B 19/042* | (2006.01) |

(52) U.S. Cl.
CPC ..... *G06Q 10/0631* (2013.01); *G06Q 10/0635* (2013.01); *G06Q 50/06* (2013.01); *G21D 3/08* (2013.01); *H02J 7/0048* (2020.01); *H02J 7/0063* (2013.01); *H02J 13/00* (2013.01); *G05B 19/0428* (2013.01); *Y02P 90/02* (2015.11)

(58) Field of Classification Search
CPC ........... G06Q 10/0631; G06Q 10/0635; G06Q 50/06; G21D 3/08; Y02P 90/02; Y02B 90/20; Y02E 30/00; Y04S 20/00
See application file for complete search history.

(56) References Cited

U.S. PATENT DOCUMENTS

| | | | |
|---|---|---|---|
| 2009/0171598 A1* | 7/2009 | Nakashima | G01R 31/3648 702/63 |
| 2010/0007481 A1* | 1/2010 | Uchida | B60L 55/00 340/455 |
| 2011/0095899 A1* | 4/2011 | Saito | G06F 3/1423 340/691.6 |
| 2011/0183303 A1 | 7/2011 | Yamamoto et al. | |
| 2011/0213488 A1 | 9/2011 | Suzuki et al. | |
| 2011/0282508 A1* | 11/2011 | Goutard | H04L 63/20 700/293 |
| 2011/0299646 A1 | 12/2011 | Hirahatake | |
| 2012/0147802 A1* | 6/2012 | Ukita | H04W 52/0258 370/311 |
| 2012/0166008 A1* | 6/2012 | Jeong | H02J 13/00002 700/295 |
| 2013/0030920 A1* | 1/2013 | Wu | B60L 1/02 705/14.64 |
| 2014/0039833 A1 | 2/2014 | Sharpe, Jr. et al. | |
| 2015/0048679 A1* | 2/2015 | Kotowski | H04Q 9/00 307/31 |
| 2015/0229128 A1* | 8/2015 | Nomura | H02J 3/383 700/287 |
| 2015/0264547 A1 | 9/2015 | Kobayashi | |
| 2015/0372509 A1* | 12/2015 | Hsieh | H02J 7/1423 320/101 |
| 2016/0226250 A1* | 8/2016 | Fukubayashi | H02J 3/32 |

FOREIGN PATENT DOCUMENTS

| | | |
|---|---|---|
| EP | 2600489 A1 | 6/2013 |
| JP | H06117884 A | 4/1994 |
| JP | H08220279 A | 8/1996 |
| JP | 10-268933 A | 10/1998 |
| JP | 10-334078 A | 12/1998 |
| JP | 2001-67574 A | 3/2001 |
| JP | 2003-177686 A | 6/2003 |
| JP | 2006-136085 A | 5/2006 |
| JP | 2006-292402 A | 10/2006 |
| JP | 2008-172406 A | 7/2008 |
| JP | 2011-210205 A | 10/2011 |
| JP | 2013-88829 A | 5/2013 |
| JP | 2013-214207 A | 10/2013 |
| JP | 2014032672 A | 2/2014 |
| JP | 2014-78070 A | 5/2014 |
| WO | 2009150950 A1 | 12/2009 |
| WO | 2014/057835 A | 4/2014 |

OTHER PUBLICATIONS

Written Opinion of the ISA in PCT/JP2016/059696, dated May 24, 2016. 8pp.
Office Action for Japanese Application No. 2017-509924 dated Dec. 4, 2018; 7pp.
Office Action for Japanese Application No. 2017-509924 dated Jun. 18, 2019; 5pp.
Extended European Search Report in EP Application No. 16772664.5, dated May 4, 2018, 8pp.
Office Action for European Application No. 16 772 664.5 dated May 20, 2021; 7pp.

* cited by examiner

FIG.13

| LEVEL NUMBER | PHENOMENON | PHENOMENON DETAILS | CHECK ITEM AND SATISFYING REQUIREMENT THEREOF | INPUT SIGNAL AND SATISFYING VALUE THEREOF | DETERMINATION | DETERMINATION LOGIC |
|---|---|---|---|---|---|---|
| LOW LEVEL NUMBER 31 | RISK OF FUNCTION LOSS OF FACILITY B | (1) LEVEL OF STORED WATER IN FACILITY B DECREASED TO BE EQUAL TO OR LESS THAN PREDETERMINED RANGE (-Zcm) FROM SPECIFIC POSITION (2) IN STATE WHERE LOW STORED WATER LEVEL WARNING HAS BEEN TRANSMITTED OR WHERE THERE IS RISK THEREOF, STATE, IN WHICH LEVEL OF STORED WATER USED IS UNABLE TO BE CONFIRMED WITH MEASURING INSTRUMENT OR VISUALLY, HAS CONTINUED FOR SPECIFIC TIME PERIOD OR LONGER | [1] STORED WATER LEAKAGE DETECTION WARNING | [1]-1 STORED WATER LEAKAGE DETECTION WARNING SIGNAL VALUE=1 | ∨ | (logic diagram producing LOW LEVEL 31) |
| | | | [2] LEVEL OF STORED WATER IN a-PIT OR b-PIT OF FACILITY B IS EQUAL TO OR LESS THAN PREDETERMINED RANGE FROM SPECIFIC POSITION | [2]-1 SIGNAL VALUE FOR WHEN LEVEL OF STORED WATER IN a-PIT OR b-PIT IS EQUAL TO OR LESS THAN PREDETERMINED RANGE=1 | ∨ | |
| | | | [3] TRANSMISSION OF LOW STORED WATER LEVEL WARNING FOR a-PIT OR b-BIT OF FACILITY B | [3]-1 LOW STORED WATER LEVEL WARNING SIGNAL VALUE FOR a-PIT=1 | ∨ | |
| | | | | [3]-2 LOW STORED WATER LEVEL WARNING SIGNAL VALUE FOR b-PIT=1 | ∨ | |
| | | | [4] CHECK OF WATER LEVEL | [4]-1 SIGNAL VALUE FOR WHEN LEVEL OF STORED WATER IN a-PIT OR b-PIT IS ABLE TO BE CHECKED=0 | | |
| | | | [5] SETTING OF TIMER FOR ELAPSE OF PREDETERMINED TIME PERIOD FROM INABILITY TO CHECK WATER LEVEL | [5]-1 SET PREDETERMINED TIME PERIOD FROM INPUT OF SIGNAL VALUE FOR WHEN LEVEL OF STORED WATER IN a-PIT OR b-PIT IS UNABLE TO BE CHECKED=1 BY AN OPERATOR | | |

FIG.15

| LOW | INTERMEDIATE | HIGH |
|---|---|---|
|  | 02 | 02 |
|  | 03 | 03 |
|  | 04 | 04 |
|  | 05 | 05 |
|  | 06 | 06 |
|  |  |  |
| 10 |  | 10 |
|  |  |  |
| 24 | 24 | 24 |
| 25 | 25 | 25 |
| 26 | 26 | 26 |
|  | 27 | 27 |
|  |  | 28 |
| 29 | 29 | 29 |
| 31 | 31 | 31 |
|  |  |  |
| 42 | 42 | 42 |
|  | 43 |  |
|  |  |  |
| 51 | 51 | 51 |
| 52 | 52 |  |
| 53 | 53 |  |
|  | 54 | 54 |
|  | 56 | 56 |

CONDITION DETERMINATION SYSTEM, CONDITION DETERMINATION METHOD, DECISION-MAKING SUPPORT SYSTEM, COMPUTER PROGRAM, AND STORAGE MEDIUM

RELATED APPLICATIONS

The present application is a National Phase of International Application Number PCT/JP2016/059696, filed Mar. 25, 2016, which claims priority to JP 2015-073944 filed Mar. 31, 2015 and JP 2015-073947 filed Mar. 31, 2015.

FIELD

The present invention relates to a condition determination system, a condition determination method, a decision-making support system, a computer program, and a storage medium.

BACKGROUND

When a disaster, such as a severe accident in a nuclear power plant, occurs, disaster measures offices are set up in various related places, and measures are taken. When a disaster occurs, decision-making for measures may be supported by use of a decision-making support system. Examples of the decision-making support system are disclosed in Patent Literature 1 to Patent Literature 3. Further, techniques for managing information at the time of a disaster are described in Patent Literature 4 to Patent Literature 6.

CITATION LIST

Patent Literature

Patent Literature 1: Japanese Unexamined Patent Application Publication No. 2013-088829 A
Patent Literature 2: Japanese Unexamined Patent Application Publication No. 2014-078070 A
Patent Literature 3: International Publication Pamphlet No. WO 2014/057835 A
Patent Literature 4: Japanese Unexamined Patent Application Publication No. 2006-292402 A
Patent Literature 5: Japanese Unexamined Patent Application Publication No. 2011-210205 A
Patent Literature 6: Japanese Unexamined Patent Application Publication No. 2003-177686 A

SUMMARY

Technical Problem

When a disaster occurs in a plant, the condition of the plant needs to be determined accurately for measures to be taken. For accurate determination of a condition of a plant, a large number of data on the plant need to be collected. However, collection of a large amount of data takes time. If the determination of the condition of the plant is delayed, measures are delayed. Therefore, a technique for enabling a condition of a plant to be promptly determined is demanded. Further, not only for a plant facility, but also for, for example, a transportation facility, such as an expressway or a railway, or a building facility, such as an apartment facility or a commercial facility; a technique for promptly determining a condition of that facility when a disaster occurs is demanded.

An object of an aspect of the present invention is to provide a condition determination system, a condition determination method, a computer program, and a storage medium, which enable prompt determination of a condition. Further, an object of another aspect of the present invention is to provide a decision-making support system that is able to effectively support decision-making by using the condition determination system.

Solution to Problem

According to a first aspect of the present invention, a condition determination system is provided and includes an operation condition data obtaining unit that obtains operation condition data indicating an operation condition of a facility, and a determination unit that determines, based on the operation condition data, a level of a phenomenon that occurs due to the operation condition of the facility.

According to the first aspect of the present invention, by the obtainment of the operation condition data of the facility, based on the operation condition data, the level of the phenomenon that occurs due to the operation condition of the facility is able to be determined. Thereby, the condition is able to be determined promptly.

In the first aspect of the present invention, the condition determination system may include a storage unit that stores therein relation data indicating a relation between the operation condition of the facility and the level of the phenomenon. The determination unit may determine the level of the phenomenon, based on the operation condition data and the relation data.

Thereby, when the operation condition data obtaining unit obtains the operation condition data of the facility, based on the relation data stored in the storage unit, the level of the phenomenon is able to be determined. Therefore, the condition is able to be determined promptly.

In the first aspect of the present invention, the condition determination system may include a display control unit that generates display data, based on a result of the determination by the determination unit, and causes a display unit to display thereon the display data.

Thereby, the determination result for the level of the phenomenon is able to be recognized visually.

In the first aspect of the present invention, the operation condition data obtaining unit may obtain the operation condition data of each of plural facilities, the determination unit may classify, based on the plural sets of operation condition data, the plural facilities into normal facilities and abnormal facilities, and the display control unit may cause the display device to display thereon the normal facilities and abnormal facilities in different designs.

Thereby, via the display on the display device, states of the facilities are recognized promptly. Therefore, planning for the facilities, such as making a recovery plan for the facilities or a use plan for any operable facilities thereof, is able to be carried out appropriately.

In the first aspect of the present invention, the facilities may include a storage battery power source, the operation condition data may include remaining capacity data indicating a remaining battery capacity of the storage battery power source, and the display control unit may cause the display device to display thereon the remaining capacity data.

Thereby, for example, the power source with a large remaining battery capacity is able to be assigned appropriately.

In the first aspect of the present invention, the facilities may include a storage battery power source, the operation condition data may include power feedable time data indicating a time period, over which the storage battery power source is able to feed power, and the display control unit may cause the display device to display thereon the power feedable time data.

Thereby, for example, the power source with a long power feedable time period is able to be assigned appropriately. The time period, over which the storage battery power source is able to feed power, is calculated based on necessary power of a device that the power is fed to.

In the first aspect of the present invention, the facilities may include power sources, and the display control unit may cause the display device to display thereon the plural power sources correspondingly to capabilities of the power sources, respectively.

Thereby, which power source of the plural power sources should be used to supply power is able to be determined promptly.

In the first aspect of the present invention, the facilities may include power sources, and the condition determination system may include a characteristic data obtaining unit that obtains characteristic data of each of the plural power sources, the characteristic data including power feeding capabilities thereof, and a power source management unit that elects, based on necessary power data indicating power necessary for electric devices to operate and the characteristic data, the power source to be assigned to a specific electric device, and the display control unit may cause the display device to display thereon the power source elected.

Thereby, if a specific electric device is desired to be operated, which power source of the plural power sources should be used to supply power is able to be determined promptly.

In the first aspect of the present invention, the facilities may include an existing power source, and a portable power source that substitutes for the existing power source, the condition determination system may include a position data obtaining unit that obtains position data indicating a position of the portable power source, and the display control unit may cause the display device to display thereon the position data.

Thereby, the position of the portable power source is able to be recognized promptly, and planning for the power sources is able to be carried out appropriately.

In the first aspect of the present invention, the portable power source may include a storage battery power source, and the display control unit may cause the display device to display thereon remaining capacity data indicating a remaining battery capacity of the storage battery power source.

Thereby, for example, the portable power source with a large remaining battery capacity is able to be assigned appropriately.

In the first aspect of the present invention, the portable power source may include a storage battery power source, and the display control unit may cause the display device to display thereon power feedable time data indicating a time period, over which the storage battery power source is able to feed power.

Thereby, for example, the power source with a long power feedable time period is able to be assigned appropriately. The time period, over which the storage battery power source is able to feed power, is calculated based on necessary power of a device that the power is fed to.

According to a second aspect of the present invention, a decision-making support system is provided and includes the condition determination system of the first aspect, and an information management unit that shares, via a network, abnormality data including the operation condition data necessary at the time of abnormality. The decision-making support system supports decision-making for measures at the time of abnormality.

According to the second aspect of the present invention, since the abnormality data including the operation condition data are shared by the related places, decision-making is able to be effectively supported by use of the abnormality data.

In the second aspect of the present invention, the information management unit may distribute report data generated based on the level of the phenomenon.

Thereby, the related places are able to be notified of the determination result for the level of each phenomenon, and measures are able to be taken urgently at the related places.

According to a third aspect of the present invention, a condition determination method is provided and includes obtaining operation condition data indicating an operation condition of a facility, determining, based on the operation condition data, a level of a phenomenon that occurs due to the operation condition of the facility, and generating, based on a result of the determination of the level of the phenomenon, display data, and causing a display device to display thereon the display data.

According to the third aspect of the present invention, by the obtainment of the operation condition data of the facility, based on the operation condition data, the level of the phenomenon that occurs due to the operation condition of the facility is able to be determined. Thereby, the condition is able to be determined promptly.

According to a fourth aspect of the present invention, a computer program is provided and causes a computer to execute obtaining operation condition data indicating an operation condition of a facility, determining, based on the operation condition data, a level of a phenomenon that occurs due to the operation condition of the facility, and generating, based on a result of the determination of the level of the phenomenon, display data, and causing a display device to display thereon the display data.

According to a fifth aspect of the present invention, a storage medium having a computer program recorded therein is provided and the computer program causes a computer to execute obtaining operation condition data indicating an operation condition of a facility, determining, based on the operation condition data, a level of a phenomenon that occurs due to the operation condition of the facility, and generating, based on a result of the determination of the level of the phenomenon, display data, and causing a display device to display thereon the display data.

Advantageous Effects of Invention

According to an aspect of the present invention, a condition determination system, a condition determination method, a computer program, and a storage medium, which enable prompt determination of a condition, are provided. Further, according to another aspect of the present invention, a decision-making support system, which is able to effectively support decision-making by using the condition determination system, is provided.

BRIEF DESCRIPTION OF DRAWINGS

FIG. 13 is a schematic diagram illustrating an example of the determination logic of the condition determination system according to the third embodiment.

FIG. 15 is a schematic diagram illustrating an example of display of the condition determination system according to the third embodiment.

DESCRIPTION OF EMBODIMENTS

Hereinafter, embodiments according to the present invention will be described while reference is made to the drawings, but the present invention is not limited to these embodiments. Components of the respective embodiments described below may be combined with one another, as appropriate. Further, a part of the components may be not used.

First Embodiment

Figure 1:
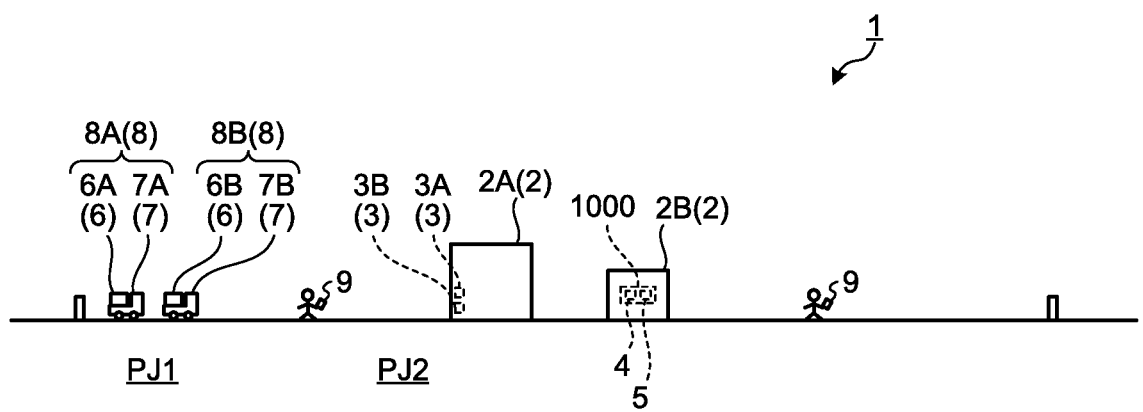
FIG. 1 is a diagram schematically illustrating an example of a plant according to a first embodiment.

A first embodiment will now be described. FIG. 1 is a diagram schematically illustrating an example of a plant 1 according to this embodiment. In this embodiment, the plant 1 is a nuclear power plant that generates electricity by using nuclear power. The plant 1 has a nuclear reactor system including a nuclear reactor, and a turbine system including a steam turbine and a generator. The nuclear reactor is a light water reactor that uses light water as: a reactor core coolant; and a neutron moderator. The nuclear reactor system includes a primary cooling system, through which primary cooling water circulates. The turbine system includes a secondary cooling system, through which secondary cooling water circulates. The nuclear reactor system (primary cooling system) and the turbine system (secondary cooling system) are separated by a steam generator. The nuclear reactor system includes a pressurized water reactor (PWR) that generates steam of the secondary cooling water by: generating high temperature and high pressure primary cooling water (hot water); supplying that hot water to the steam generator; and carrying out heat exchange between the primary cooling water (hot water) and the secondary cooling water in the steam generator. In this embodiment, the nuclear power plant is a pressurized water nuclear power plant.

The nuclear reactor system heats up the primary cooling water with thermal energy generated by nuclear reactions, in a state where the primary cooling water has been pressurized and the boiling point of that primary cooling water has been increased. The nuclear reactor system generates the high temperature and high pressure hot water by heating up pressurized water that has been pressurized, and supplies that hot water to the steam generator. In the nuclear reactor system, the primary cooling water is heated up such that the primary cooling water does not boil. The turbine system converts the secondary cooling water into high temperature and high pressure steam by heat exchange between the primary cooling water (hot water) and the secondary cooling water. The steam turbine is actuated by that steam. The generator is actuated by the actuation of the steam turbine, and generates electricity.

Plural constructions 2 are arranged on the premises of the plant 1. The constructions 2 include: a first construction (building) 2A, in which the nuclear reactor system and the turbine system are arranged; and a second construction (control building) 2B, in which at least a part of a management system 1000 for management of the plant 1 is arranged.

The nuclear reactor system and the turbine system have plural existing devices 3. The existing devices 3 include an existing pump 3A and an existing power source 3B. The existing power source 3B includes an external power source, an internal power source, an emergency power source (emergency generator), and a storage battery power source. The existing devices 3 include an electric device operated by power supplied thereto. The electric device includes, for example, an existing pump 3A.

The management system 1000 performs management of the plant 1. The management system 1000 includes a computer system 4 and a display device 5. The computer system 4 and the display device 5 are arranged in the second construction 2B.

Portable devices 6 are provided in the plant 1. The portable devices 6 are supported by vehicles 7. The portable devices 6 are transported by the vehicles 7. In this embodiment, the portable devices 6 include a portable pump 6A and a portable power source 6B. The vehicles 7 include a vehicle 7A that transports the portable pump 6A, and a vehicle 7B that transports the portable power source 6B.

In the following description, the portable devices 6 and the vehicles 7 together will be referred to as, device vehicles 8 as appropriate, the portable pump 6A and the vehicle 7A together will be referred to as a pump vehicle 8A as appropriate, and the portable power source 6B and the vehicle 7B together will be referred to as a power source vehicle 8B, as appropriate. The device vehicles 8 include the pump vehicle 8A and the power source vehicle 8B.

If an abnormality occurs in any of the existing devices 3, that existing device 3 is substituted by the portable device 6. When the existing devices 3 are normal, the portable devices 6 (device vehicles 8) are arranged (kept) at a standby position PJ1 in the plant 1. If an abnormality occurs in the existing device 3, the portable device 6 is transported to a predetermined position PJ2 for substitution, from the standby position PJ1, and operates in place of the existing device 3.

In the plant 1, plural operators are at work. The operators carry mobile terminals 9. The mobile terminals 9 include a mobile computer, such as a smartphone or a tablet type personal computer.

Figure 2:
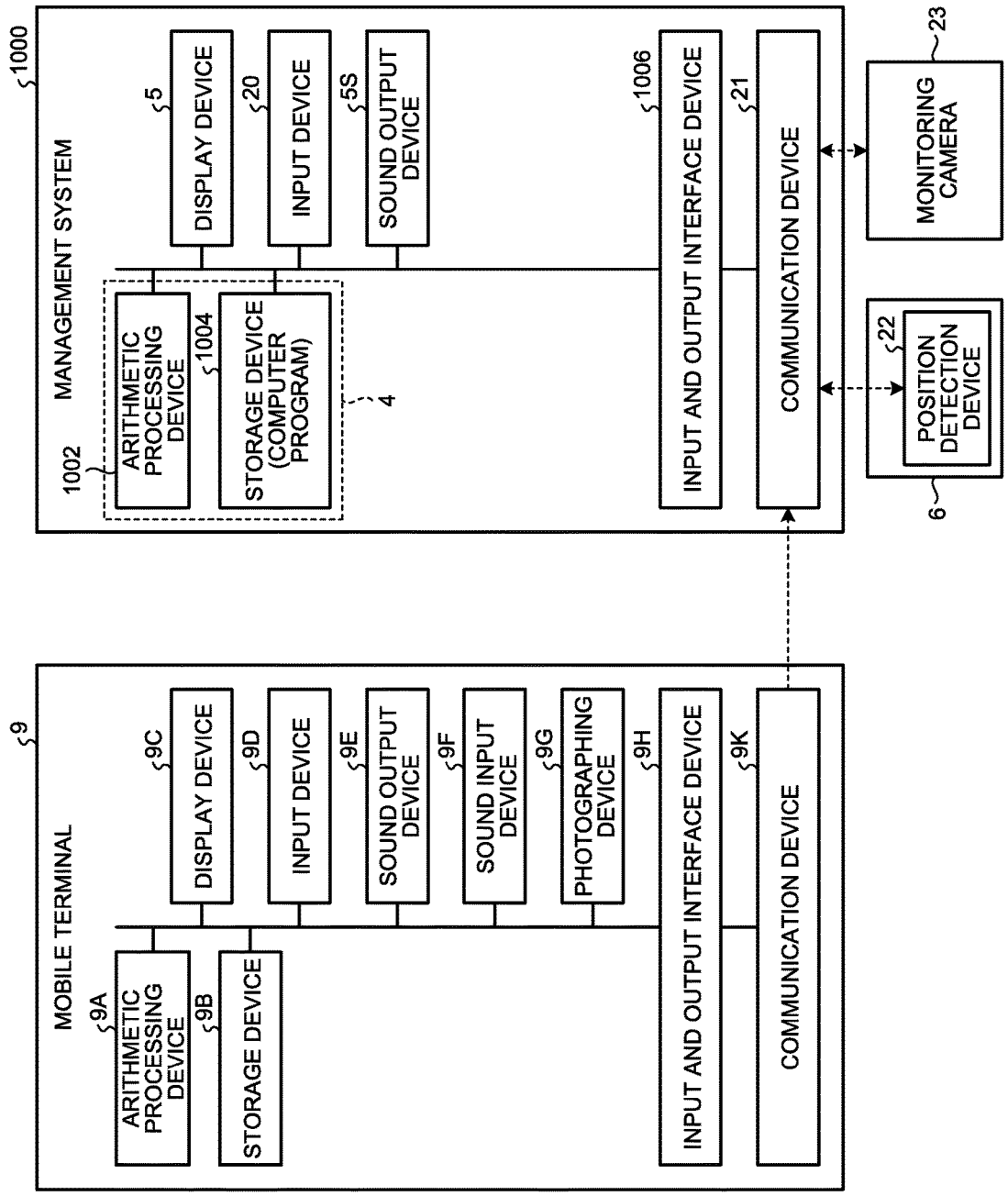
FIG. 2 is a block diagram illustrating an example of a hardware configuration of a mobile terminal and a management system, according to the first embodiment.

FIG. 2 is a block diagram illustrating a hardware configuration of the mobile terminal 9 and the management system 1000, according to this embodiment.

The mobile terminal 9 has an arithmetic processing device 9A, a storage device 9B, a display device 9C, an input device 9D, a sound output device 9E, a sound input device 9F, a photographing device 9G, an input and output interface device 9H, and a communication device 9K.

The arithmetic processing device 9A includes a microprocessor, such as a central processing unit (CPU). The storage device 9B includes a memory, such as a read only memory (ROM) or a random access memory (RAM), and a storage.

The display device 9C includes a flat panel display, such as a liquid crystal display (LCD), or an organic electroluminescence display (OLED). By being operated, the input device 9D generates input data. In this embodiment, the input device 9D includes a touch sensor provided on a display screen of the display device 9C. The display device 9C includes a touch panel.

The sound output device 9E includes a speaker. The sound input device 9F includes a microphone.

The photographing device 9G has a video camera function enabling moving image data of a subject to be obtained, and a still camera function enabling still image data of a subject to be obtained. The photographing device 9G has an optical system, and an imaging element that obtains photographic data of a subject via the optical system. The imaging element includes a charge coupled device (CCD) image sensor or a complementary metal oxide semiconductor (CMOS) image sensor.

The input and output interface device 9H carries out data communication with the arithmetic processing device 9A, the storage device 9B, the display device 9C, the input device 9D, the sound output device 9E, the sound input device 9F, the photographing device 9G, and the communication device 9K.

The communication device 9K carries out data communication wirelessly with the management system 1000. The communication device 9K carries out data communication with the management system 1000 by using at least one of a mobile phone communication network, the Internet connection, and a local area network.

The management system 1000 includes the computer system 4. The management system 1000 has an arithmetic processing device 1002, a storage device 1004, the display device 5, an input device 20, a sound output device 5S, an input and output interface device 1006, and a communication device 21.

The arithmetic processing device 1002 includes a microprocessor, such as a CPU. The storage device 1004 includes a memory, such as a ROM or a RAM, and a storage. The arithmetic processing device 1002 executes arithmetic processing according to a computer program stored in the storage device 1004.

The display device 5 includes a flat panel display. By being operated, the input device 20 generates input data. The input device 20 includes at least one of a keyboard and a mouse. The input device 20 may include a touch sensor provided on a display screen of the display device 5. The sound output device 5S includes a speaker.

The input and output interface device 1006 carries out data communication with the arithmetic processing device 1002, the storage device 1004, the display device 5, the input device 20, the sound output device 5S, and the communication device 21.

The communication device 21 carries out data communication wirelessly with the mobile terminal 9. The communication device 21 carries out data communication with the mobile terminal 9 by using at least one of a mobile phone communication network, the Internet connection, and a local area network.

The mobile terminal 9 and the management system 1000 may carry out data communication wiredly. Further, the management system 1000 is able to carry out data communication with position detection devices 22 provided in the portable devices 6, and monitoring cameras 23 provided in the plant 1.

Figure 3:
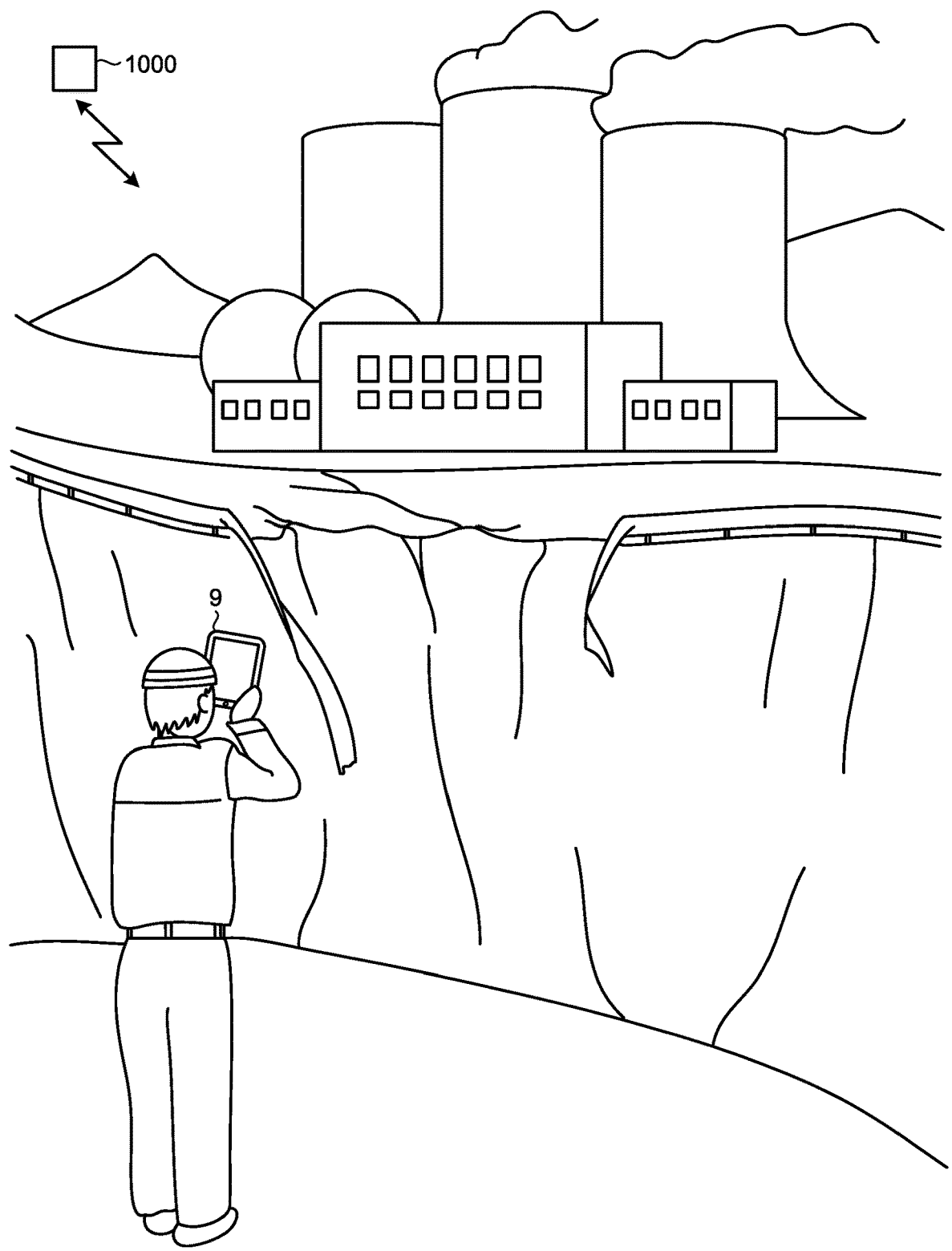
FIG. 3 is a diagram illustrating an example of the mobile terminal according to the first embodiment.

FIG. 3 is a diagram illustrating an example of the mobile terminal 9 according to this embodiment. As illustrated in FIG. 3, an operator is able to obtain images or videos (moving images) of various positions (places) in the plant 1, by using a camera of the mobile terminal 9. Further, the operator is able to obtain sound in various places of the plant 1, by using the sound input device 9F of the mobile terminal 9. The operator is able to obtain an image of a traveling path (road) provided on the premises of the plant 1, by using the photographing device 9G. The operator is able to obtain an image of inside of the construction 2, by using the photographing device 9G. An image of the plant 1 obtained by the photographing device 9G of the mobile terminal 9 is transmitted wirelessly to the management system 1000.

Figure 4:
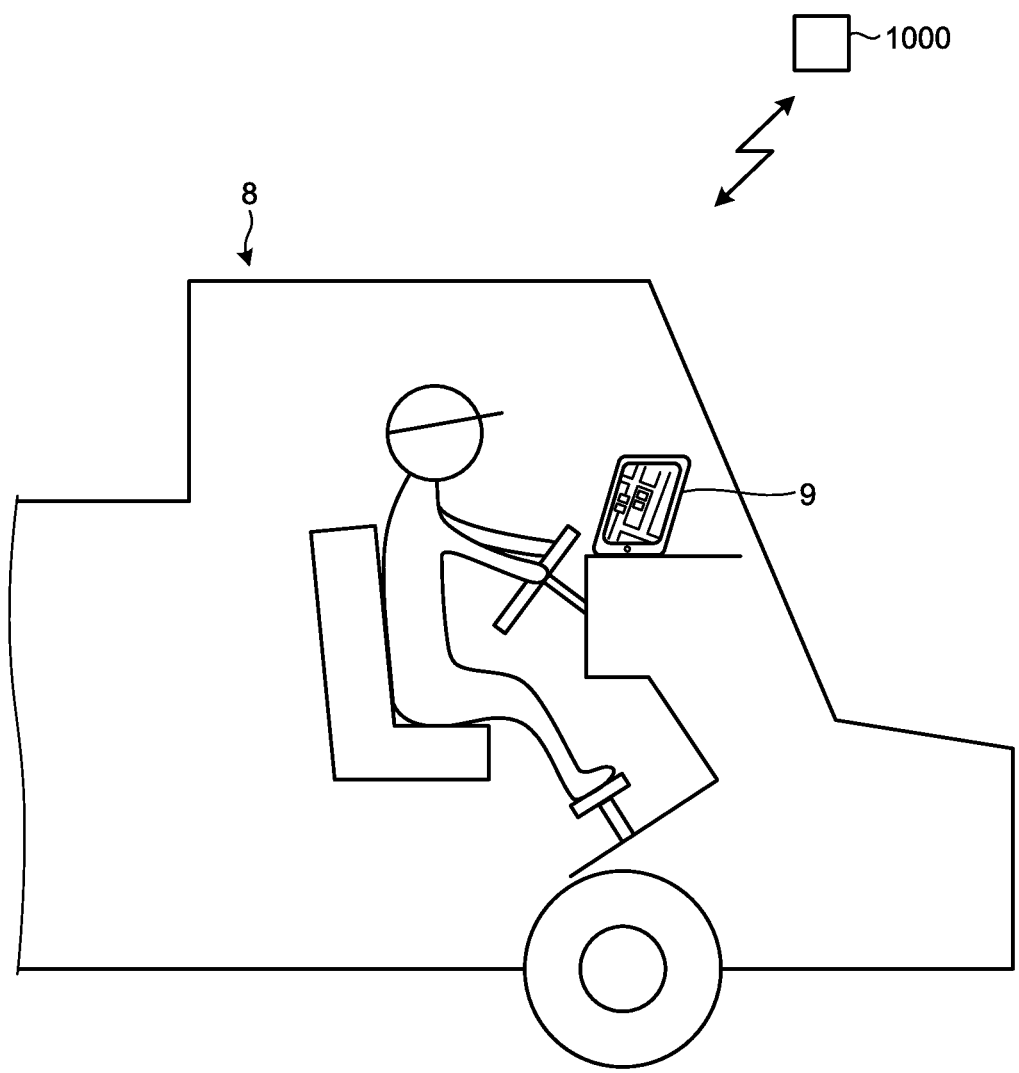
FIG. 4 is a diagram illustrating an example of the mobile terminal according to the first embodiment.

FIG. 4 is a diagram illustrating an example of the mobile terminal 9 according to this embodiment. As illustrated in FIG. 4, the device vehicle 8 (vehicle 7) is operated (driven) by an operator. The operator is able to drive the device vehicle 8 while looking at the display device 9C of the mobile terminal 9. Data transmitted from the management system 1000 to the mobile terminal 9 are displayed on the display device 9C of the mobile terminal 9. The operator is able to drive while looking at the data displayed on the display device 9C of the mobile terminal 9. Further, the operator is able to drive by using a navigation function of the mobile terminal 9. The navigation function of the mobile terminal 9 includes navigation with sound and navigation with images.

Figure 5:
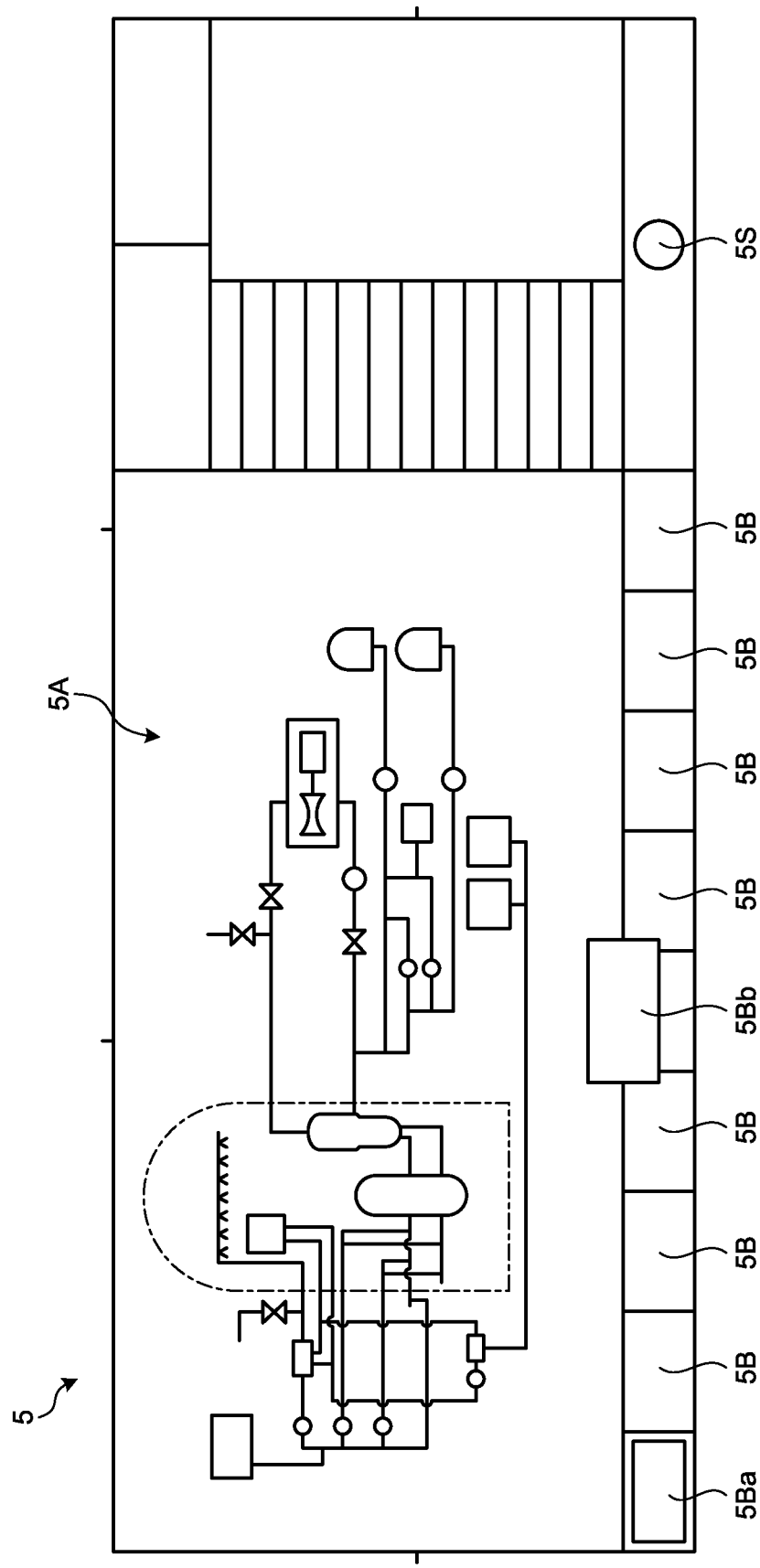
FIG. 5 is a diagram illustrating an example of a display device according to the first embodiment.

FIG. 5 is a diagram illustrating an example of the display device 5 of the management system 1000 according to this embodiment. In this embodiment, the display device 5 includes a touch panel. An operator is able to operate a screen displayed on the display device 5 by touching the touch sensor provided on the display screen of the display device 5. The operator is able to input an input signal (operation signal) by touching the touch sensor of the display device 5.

In this embodiment, the display device 5 includes a combination of plural touch panels. In this embodiment, two wide type touch panels are vertically arranged, and three wide type touch panels are horizontally arranged. That is, in this embodiment, the display device 5 includes a combination of six touch panels. The display device 5 includes six displays and one large sized touch sensor set extending over the six displays.

The display device 5 is able to display a main screen 5A and subscreens 5B. In a main screen area where the main screen 5A is displayed, plural main screens 5A are able to be displayed. The subscreens 5B are arranged below the main screen 5A. The main screen 5A is able to display thereon display data input to the display device 5 by use of at least one of an image, a numerical value, and a character. In the example illustrated in FIG. 5, display data depicting a cooling system and a power source system of the plant 1 are displayed on the main screen 5A. The subscreens 5B are plurally provided. Each of the subscreens 5B is able to display thereon display data input to the display device 5 by use of at least one of an image, a numerical value, and a character. When a specific subscreen 5B of the plural subscreens 5B is touched by an operator, display data being displayed on the main screen 5A and display data on the specific subscreen 5B are switched over to each other. The display data on the touched specific subscreen 5B are displayed on the main screen 5A. Further, arbitrary main screen 5A and subscreen 5B that have been selected may be switched over to each other.

The display device 5 is able to highlight a specific subscreen 5B of the plural subscreens 5B. For example, priority (importance) of display data is set in three levels. A subscreen 5B (5Bb) displaying thereon first priority display data with the highest priority is highlighted by a pop-up or display having motion. A subscreen 5B (5Ba) displaying thereon second priority display data having the second highest priority next to the first priority display data is highlighted by a colored frame being displayed therearound. The subscreen 5B (5Ba) may be highlighted by a blinking frame being displayed therearound. Subscreens 5B displaying thereon third priority display data having the lowest priority are not highlighted.

The display device 5 has the sound output device 5S that outputs sound data. The sound output device 5S includes a speaker. The display device 5 is able to generate sound by using the sound output device 5S.

Figure 6:
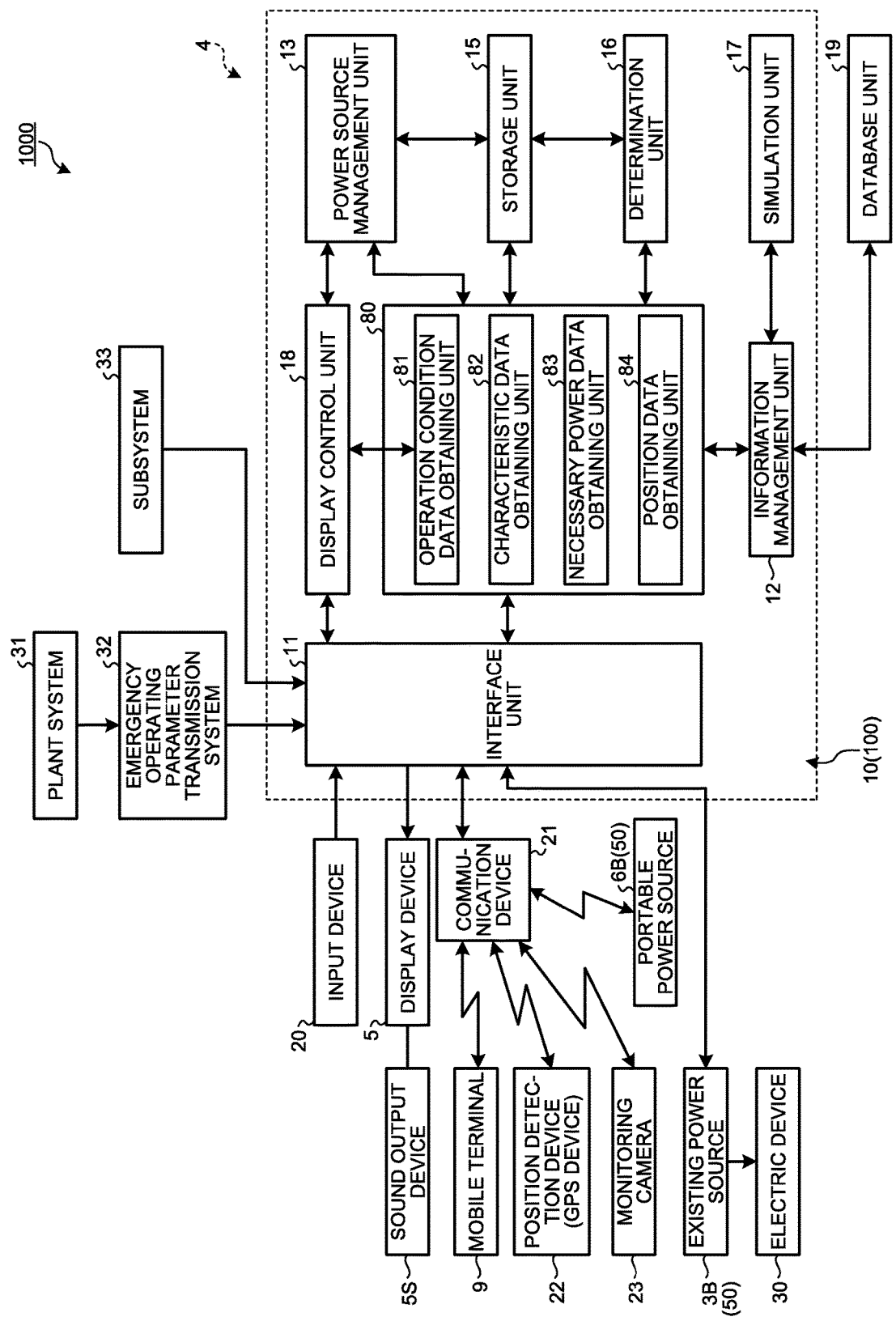
FIG. 6 is a functional block diagram illustrating an example of the management system according to the first embodiment.

Next, an example of the management system 1000 according to this embodiment will be described. FIG. 6 is a functional block diagram illustrating an example of the management system 1000 according to this embodiment. As illustrated in FIG. 6, the management system 1000 includes the computer system 4, and the display device 5.

In this embodiment, the management system 1000 includes a power source planning system 10 that plans restoration or use of power sources 50 in the plant 1. The power source planning system 10 functions as a condition determination system that determines, based on operation condition data of the power sources 50, a level of a phenomenon that occurs in the plant 1. Further, the management system 1000 includes a decision-making support system 100 that supports decision-making for measures against various phenomena at the time of emergency (abnormality), like when a disaster occurs. Functions of the power source planning system 10 are demonstrated by the arithmetic processing device 1002 of the computer system 4, and the computer program stored in the storage device 1004.

The power sources 50 include the existing power source 3B, and the portable power source 6B that substitutes for the existing power source 3B. The power sources 50 are plurally arranged in the plant 1. The power source planning system 10 obtains operation condition data indicating an operation condition of each of the plural power sources 50. The power source planning system 10 obtains the operation condition data of the power sources 50, and determines whether or not any abnormality has occurred in the power sources 50. If an abnormality occurs in some of the power sources 50 by occurrence of a disaster, the power source planning system 10 plans various requirements related to the power sources 50, including a recovery plan for the power sources 50 and a use plan for the operable power sources 50.

The existing power source 3B includes the external power source, the internal power source, the emergency power source, and the storage battery power source. The emergency power source includes an emergency generator (diesel generator: DG) that is able to generate electricity by use of a diesel engine.

The display device 5 displays thereon plural power sources 50 that are able to supply power to electric devices 30 of the plant 1 operated by power. The display device 5 displays thereon normal power sources 50 and abnormal power sources 50 in different designs. Thereby, via the display device 5, states of the power sources 50 are recognized promptly. Therefore, planning for the power sources 50 is carried out appropriately.

The computer system 4 of the management system 1000 has an interface unit 11, a data obtaining unit 80, an information management unit 12, a power source management unit 13, a storage unit 15, a determination unit 16, a simulation unit 17, and a display control unit 18.

Functions of the interface unit 11 are demonstrated by the input and output interface device 1006. Functions of the storage unit 15 are demonstrated by the storage device 1004. Functions of the data obtaining unit 80, the information management unit 12, the power source management unit 13, the determination unit 16, the simulation unit 17, and the display control unit 18 are demonstrated by the arithmetic processing device 1002.

The management system 1000 includes: a database unit 19 connected to the computer system 4; the input device 20 connected to the computer system 4; the display device 5 connected to the computer system 4; the mobile terminals 9; the position detection devices 22; the monitoring cameras 23; and the communication device 21 that is able to communicate with the power sources 50. The communication device 21 may be a wireless communication device, or a wired communication device.

The input device 20 includes at least one of a keyboard, a mouse, a microphone, and a camera, and generates an input signal (operation signal) by being operated by an operator. Plural input devices 20 may be included. If the display device 5 includes a touch panel, the input device 20 includes a display unit of the display device 5. The input signal generated by the operation on the input device 20 is supplied to the interface unit 11.

The position detection devices 22 detect positions of the portable devices 6 (device vehicles 8) and output position data indicating the positions of the portable devices 6. In this embodiment, the position detection devices 22 include a global positioning system (GPS). GPS devices (GPS receivers) are installed in the device vehicles 8. The position detection devices 22 include the GPS devices installed in the device vehicles 8. Positions of the portable devices 6 (device vehicles 8) in a global coordinate system are detected by the position detection devices 22. The position data indicating the positions of the portable devices 6 detected by the position detection devices 22 are supplied to the interface unit 11 via the communication device 21. The position data detected by the position detection devices 22 may be temporarily stored, and supplied to the interface unit 11 wiredly connected thereto.

The monitoring cameras 23 are installed at plural positions in the plant 1. Image data obtained by the monitoring cameras 23 are supplied to the interface unit 11 via the communication device 21.

The mobile terminals 9 and the computer system 4 may be wirelessly connected to each other, or wiredly connected to each other. Data communication may be executed in a state where the mobile terminal 9 and the computer system 4 have been wiredly connected to each other. The position detection devices 22 and the computer system 4 may be wirelessly connected to each other, or wiredly connected to each other. Data communication may be executed in a state where the position detection device 22 and the computer system 4 have been wiredly connected to each other. The monitoring cameras 23 and the computer system 4 may be wiredly connected to each other.

The interface unit 11 obtains data supplied from external devices of the computer system 4. Further, the interface unit 11 supplies data from the computer system 4 to the external devices.

The data obtaining unit 80 has: an operation condition data obtaining unit 81 that obtains operation condition data indicating operation conditions of the power sources 50; a characteristic data obtaining unit 82 that obtains characteristic data of each of the plural power sources 50; a necessary power data obtaining unit 83 that obtains necessary power data indicating power necessary for the electric devices 30 to operate; and a position data obtaining unit 84 that obtains position data indicating a position of the portable power source 6B.

The operation condition data obtaining unit 81 obtains the operation condition data indicating an operation condition of each of the plural power sources 50. The operation condition data are supplied to the operation condition data obtaining unit 81 from the power source 50 (existing power source 3B or portable power source 6B) via the interface unit 11. When the power source 50 is normal, a signal indicating a normal state (normal signal) is supplied from the power source 50 to the operation condition data obtaining unit 81. When the power source 50 is abnormal, a signal indicating an abnormal state (abnormal signal) is supplied from the power source 50 to the operation condition data obtaining unit 81. The operation condition data include at least one of the normal signal and the abnormal signal.

The normal state of the power source 50 includes a state where the power source 50 operates normally and is able to output expected power. The abnormal state of the power source 50 includes an inoperable state, and a state where the power source 50 does operate but is unable to output expected power.

The characteristic data obtaining unit 82 obtains the characteristic data of each of the plural power sources 50. The characteristic data of the power sources 50 include power feeding capabilities of the power sources 50. The characteristic data of the power sources 50 are stored in the storage unit 15. The characteristic data obtaining unit 82 obtains the characteristic data of each of the plural power sources 50 from the storage unit 15.

The necessary power data obtaining unit 83 obtains the necessary power data indicating the power necessary for the electric devices 30 to operate. The necessary power data of the electric devices 30 are stored in the storage unit 15. The interface unit 11 obtains necessary power data of each of the plural electric devices 30 from the storage unit 15.

The position data obtaining unit 84 obtains position data indicating positions of the portable devices 6 including the portable power source 6B. The position data indicating the positions of the portable devices 6 detected by the position detection devices 22 are supplied to the position data obtaining unit 84 via the communication device 21.

As described above, the existing power source 3B includes the storage battery power source. The portable power source 6B includes a storage battery power source. The operation condition data obtaining unit 81 is able to obtain remaining capacity data indicating remaining battery capacities of the storage battery power sources. Remaining capacity data are supplied from the existing power source 3B including the storage battery power source, to the operation condition data obtaining unit 81. Remaining capacity data are supplied from the portable power source 6B including the storage battery power source, to the operation condition data obtaining unit 81. The operation condition data of the power sources 50 include the remaining capacity data of the storage battery power sources.

Further, the operation condition data obtaining unit 81 is able to obtain power feedable time data indicating time periods, over which the storage battery power sources are able to feed power. Power feedable time data are supplied from the existing power source 3B including the storage battery power source, to the operation condition data obtaining unit 81. Power feedable time data are supplied from the portable power source 6B including the storage battery power source, to the operation condition data obtaining unit 81. The operation condition data of the power sources 50 include the power feedable time data of the storage battery power sources.

The operation condition data obtaining unit 81 functions as a remaining capacity data obtaining unit that obtains the remaining capacity data indicating the remaining battery capacities of the storage battery power sources.

The operation condition data obtaining unit 81 functions as a power feedable time data obtaining unit that obtains the power feedable time data indicating the time periods, over which the storage battery power sources are able to feed power.

A time period, over which a storage battery power source is able to feed power, is calculated based on necessary power of a device or devices that the power is fed to.

The power source management unit 13 manages, based on the respective operation condition data of the plural power sources 50 obtained by the operation condition data obtaining unit 81, a state (normal state or abnormal state) of each of the plural power sources 50. The power source management unit 13 generates, based on the respective operation condition data of the plural power sources 50 obtained by the operation condition data obtaining unit 81, data to be displayed on the display device 5.

The storage unit 15 stores therein data necessary for planning for the power sources 50. The storage unit 15 stores therein the characteristic data of each of the plural power sources 50. The storage unit 15 stores therein the necessary power data of each of the plural electric devices 30.

The power source management unit 13 elects, based on the necessary power data and characteristic data stored in the storage unit 15, the power source 50 to be assigned to a specific one of the electric devices 30.

The display control unit 18 controls the display device 5. The display control unit 18 generates display data to be displayed on the display device 5, by processing data supplied from the data obtaining unit 80 and the power source management unit 13.

The interface unit 11 is connected to a plant system 31 via an emergency operating parameter transmission system 32. Further, the interface unit 11 is connected to a subsystem 33.

The plant system 31 manages plant data of the plant 1. The plant data include operation data for the nuclear reactor system, and are detected by sensors arranged in the nuclear reactor system. The plant data include, for example, temperature data of the nuclear reactor, and flow rate data of the primary cooling water of the nuclear reactor system. The data obtaining unit 80 is able to obtain the plant data from the plant system 31.

The emergency operating parameter transmission system 32 outputs emergency operating parameters of the plant 1. The data obtaining unit 80 is able to obtain the emergency operating parameters from the emergency operating parameter transmission system 32.

The subsystem 33 manages peripheral data of the plant 1, the peripheral data being different from the plant data. The peripheral data include, for example, meteorological data. The data obtaining unit 80 is able to obtain the peripheral data from the subsystem 33.

The information management unit 12 manages the plant data supplied from the plant system 31. Further, the information management unit 12 manages data supplied from the subsystem 33, the input device 20, and the communication device 21. Furthermore, the information management unit 12 manages data stored in the database unit 19. The display control unit 18 generates display data to be displayed on the display device 5, from the data managed by the information management unit 12.

The simulation unit 17 estimates change over time of the plant 1 based on the plant data, and generates scenario data (plant presumption data) indicating a presumed phenomenon in the plant 1.

The database unit 19 stores therein the operation condition data, the characteristic data, the necessary power data, the position data, and the remaining capacity data, which have been obtained by the data obtaining unit 80. The database unit 19 stores therein the plant data supplied from the plant system 31, the scenario data generated by the simulation unit 17, and the display data generated by the display control unit 18. Further, the database unit 19 stores therein data from the subsystem 33, the input device 20, and the communication device 21.

Figure 7:
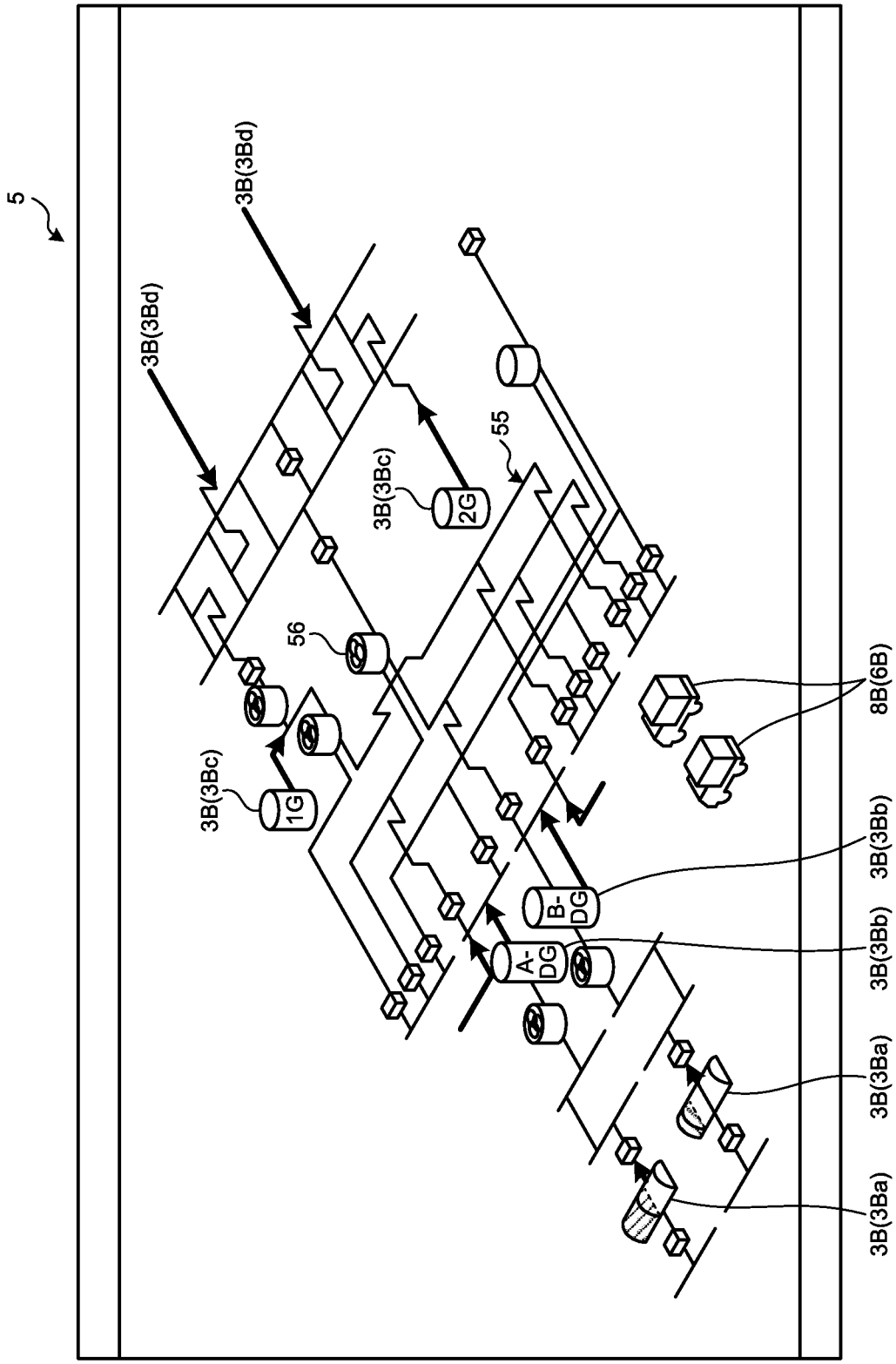
FIG. 7 is a diagram illustrating an example of the display device according to the first embodiment.

FIG. 7 is a diagram illustrating an example of the display device 5 according to this embodiment. FIG. 7 is an example of display when the plant 1 is normal. The plant 1 being normal includes a state where no disaster has occurred and the power sources 50 are normal. As illustrated in FIG. 7, the existing power source 3B includes an external power source 3Bd, an internal power source 3Bc, an emergency power source 3Bb that is able to generate electricity with a diesel engine, and a storage battery power source 3Ba.

As illustrated in FIG. 7, images depicting the power sources 50 (existing power source 3B and portable power source 6B) are displayed on the display device 5. Further, an image representing a power source line 55 that is connectable to the power sources 50, and a transformer 56 are displayed on the display device 5.

When the plant 1 is normal, power is supplied to the power source line 55 from outside (an external power source) of the plant 1. In the electric devices 30 of the plant 1, the power supplied from the outside is used. Power may be supplied to the power source line 55 from the external power source 3Bd or the internal power source 3Bc, of the existing power source 3B. The power supplied from the external power source 3Bd or the internal power source 3Bc may be used by the electric devices 30.

When the plant 1 is normal, the portable power source 6B is not connected to the power source line 55. When the plant 1 is normal, the emergency power source 3Bb does not operate. When the plant 1 is normal, power is not supplied from the storage battery power source 3Ba to the power source line 55. Even when the plant 1 is normal, as necessary, power may be supplied from the storage battery power source 3Ba. Further, if a trouble of some sort, even though not a severe accident, occurs, the emergency power source 3Bb may operate.

When the plant 1 is normal, operation condition data including normal signals are supplied from the power sources 50 (existing power source 3B and portable power source 6B) to the data obtaining unit 80. The display control unit 18 generates, based on the operation condition data including the normal signals, data to be displayed on the display device 5. The display device 5 displays thereon an electric system of the plant 1, the electric system including the power sources 50 and the power source line 55. Thereby, an operator (administrator) is able to promptly and appropriately recognize a state of the electric system via the display device 5.

Figure 8:
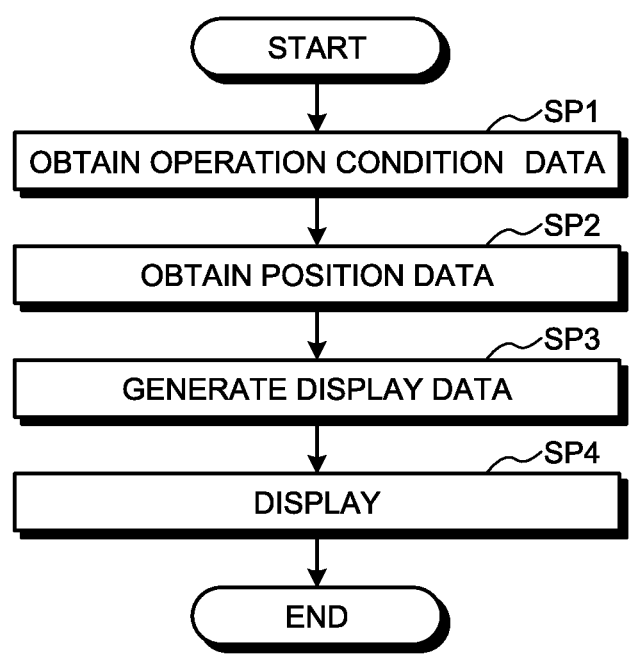
FIG. 8 is a flow chart illustrating an example of a power source planning method according to the first embodiment.

Next, an example of a power source planning method according to this embodiment will be described by reference to a flow chart in FIG. 8.

If a disaster, such as a severe accident, occurs in the plant 1, and power supply from outside (an external power source) of the plant 1 is stopped due to the occurrence of the disaster, operation condition data indicating an operation condition of each of the plural power sources 50 of the plant 1 are obtained (Step SP1). When the power sources 50 include a storage battery power source, the operation condition data include remaining capacity data indicating a remaining battery capacity of a storage battery thereof.

Further, position data indicating a position of the portable power source 6B are obtained (Step SP2).

The display control unit 18 generates, based on the obtained operation condition data and position data, display data to be displayed on the display device 5 (Step SP3).

The display device 5 displays thereon the electric system of the plant 1 at the time of the occurrence of the disaster (at the time of emergency) (Step SP4).

Figure 9:
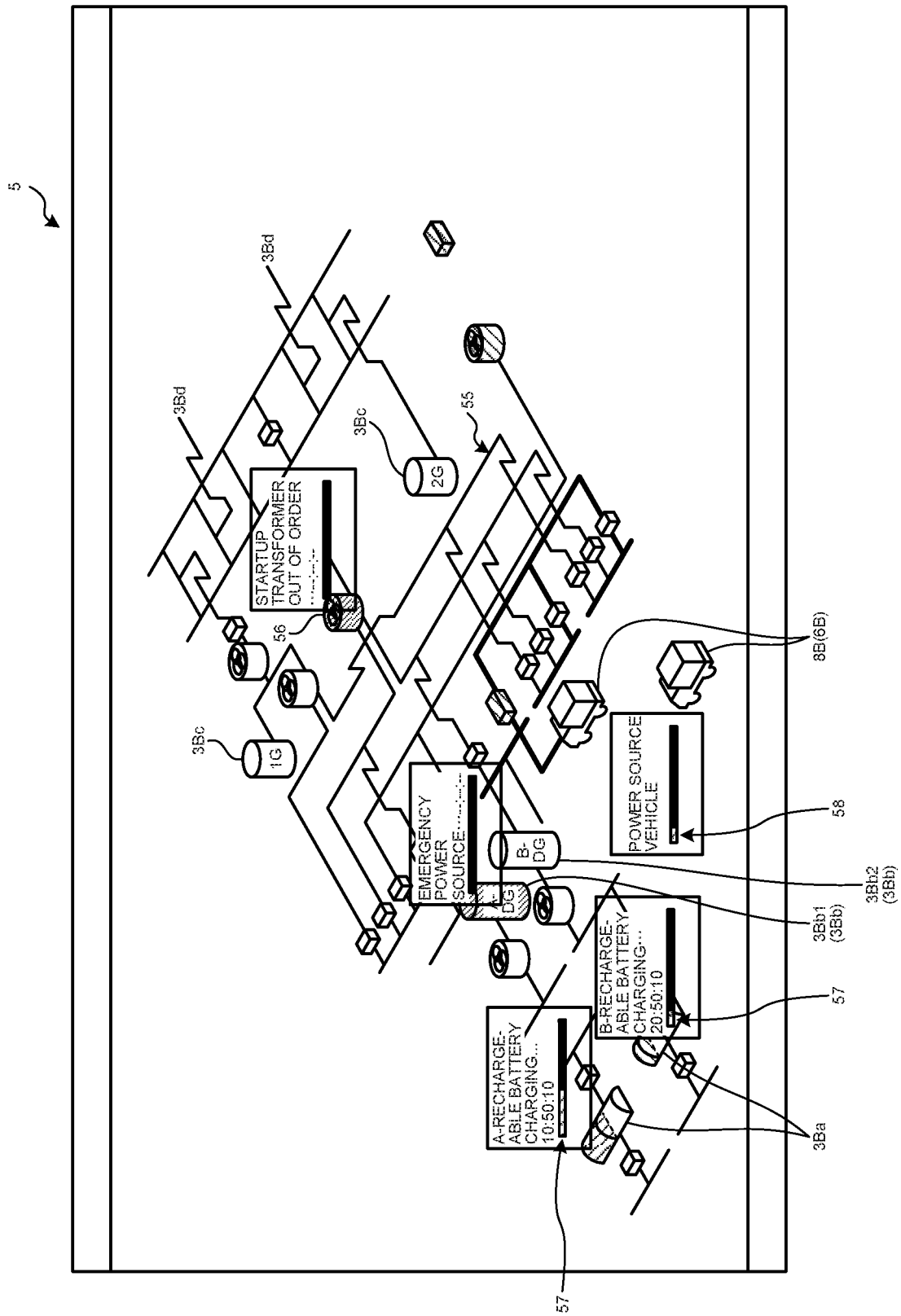
FIG. 9 is a diagram illustrating an example of the display device according to the first embodiment.

FIG. 9 is a diagram illustrating an example of the display device 5 according to this embodiment. FIG. 9 is an example of display when the plant 1 is abnormal. The plant 1 being abnormal includes a state where a disaster has occurred and the power sources 50 are abnormal.

As illustrated in FIG. 9, images depicting the power sources 50 (existing power source 3B and portable power source 6B) are displayed on the display device 5. Further, an image depicting the power source line 55 connectable to the power sources 50, and the transformer 56 are displayed on the display device 5.

As illustrated in FIG. 9, the display control unit 18 causes the display device 5 to display thereon normal power sources 50 and abnormal power sources 50 in different designs. In this embodiment, the determination unit 16 classifies, based on the operation condition data of each of the plural power sources 50 obtained by the operation condition data obtaining unit 81, the plural power sources 50 into the normal power sources 50 and the abnormal power sources 50. Based on results of the determination by the determination unit 16, the display control unit 18 generates first display data representing the normal power sources 50 and second display data representing the abnormal power sources, and causes the display device 5 to display thereon the first display data and the second display data.

In the example illustrated in FIG. 9, one emergency power source 3Bb1 of two emergency power sources 3Bb is abnormal, and the other emergency power source 3Bb2 is normal. The display device 5 displays an icon representing the emergency power source 3Bb1 and an icon representing the emergency power source 3Bb2, in different designs. In the example illustrated in FIG. 9, the icon representing the emergency power source 3Bb1 is colored in a first color, and the icon representing the emergency power source 3Bb2 is colored in a second color different from the first color.

Further, in this embodiment, text indicating that the emergency power source 3Bb1 is abnormal (out of order) is displayed on the display device 5.

As illustrated in FIG. 7, if both of the two emergency power sources 3Bb are normal, an icon representing one of the emergency power sources 3Bb and an icon representing the other emergency power source 3Bb are displayed in designs that are substantially the same.

Further, as illustrated in FIG. 9, in this embodiment, if some transformers 56 of plural transformers 56 are abnormal, icons representing the normal transformers 56 and icons representing the abnormal transformers 56 are displayed in different designs.

Further, in this embodiment, text indicating that some of the transformers 56 are abnormal (out of order) is displayed on the display device 5.

Further, in this embodiment, the display device 5 displays thereon remaining capacity data indicating a remaining battery capacity of the storage battery power source 3Ba. In the example illustrated in FIG. 9, the remaining capacity data are displayed by use of a bar (bar graph) 57. Further, in the example illustrated in FIG. 9, text indicating that the storage battery power source 3Ba is being charged is displayed on the display device 5.

Further, in this embodiment, the display device 5 displays thereon remaining capacity data indicating a remaining battery capacity of the portable power source 6B including the storage battery power source. In the example illustrated in FIG. 9, the remaining capacity data are displayed by use of a bar (bar graph) 58.

Further, the display device 5 displays thereon the position data indicating the position of the portable power source 6B (device vehicle 8). In this embodiment, by adjusting a position of an icon representing the portable power source 6B, the display device 5 displays thereon the position data indicating the position of the portable power source 6B.

In the example illustrated in FIG. 9, an example, in which the portable power source 6B has been connected to the power source line 55, is illustrated. For example, if power supply from the outside is stopped, and supply of power from the internal power source 3Bc is also stopped, power from at least one of the emergency power sources 3Bb, the storage battery power source 3Ba, and the portable power source 6B, is supplied to the power source line 55. The power output from at least one of the emergency power sources 3Bb, the storage battery power source 3Ba, and the portable power source 6B is supplied to the electric devices 30 via the power source line 55.

In this embodiment, the power source management unit 13 elects the power source 50 to be assigned to a specific electric device 30 of the plural electric devices 30 arranged in the plant 1, based on the necessary power data indicating the power necessary for the electric devices 30 to operate and the characteristic data indicating the power feeding capability of each of the plural power sources 50 (the emergency power sources 3Bb, the storage battery power source 3Ba, and the portable power source 6B).

For example, it is supposed that the power (electric current) necessary for the electric device 30 to operate is at a power value, "a". When the power feeding capability of the emergency power source 3Bb is at a power value, "b", smaller than the power value, "a", even if the emergency power source 3Bb and the electric device 30 are connected to each other and power is supplied from the emergency power source 3Bb to the electric device 30 via the power source line 55, the electric device 30 is unable to be operated. When the power feeding capability of the storage battery power source 3Ba is at a power value, "c", smaller than the power value, "a", the electric device 30 is also unable to be operated by use of power output from the storage battery power source 3Ba. If the power feeding capability of the portable power source 6B is at a power value, "A", larger than the power value, "a", the electric device 30 is able to be operated by use of power output from the portable power source 6B.

The necessary power data indicating the power necessary for the electric devices 30 to operate and the characteristic data indicating the power feeding capability of each of the emergency power sources 3Bb, the storage battery power source 3Ba, and the portable power source 6B are stored in the storage unit 15. The power source management unit 13 is able to elect, based on the necessary power data and characteristic data, the power source 50 (in this example, the portable power source 6B) to be assigned to the electric device 30.

By the display device 5 displaying the elected power source 50 (in this example, the portable power source 6B), an operator (administrator) is able to determine, based on the displayed result on the display device 5, a plan for connection of the portable power source 6B to the power source line 55.

When the portable power source 6B is connected to the power source line 55, as illustrated in FIG. 9, an image depicting that the portable power source 6B and the power source line 55 have been connected is displayed on the display device 5.

Figure 10:
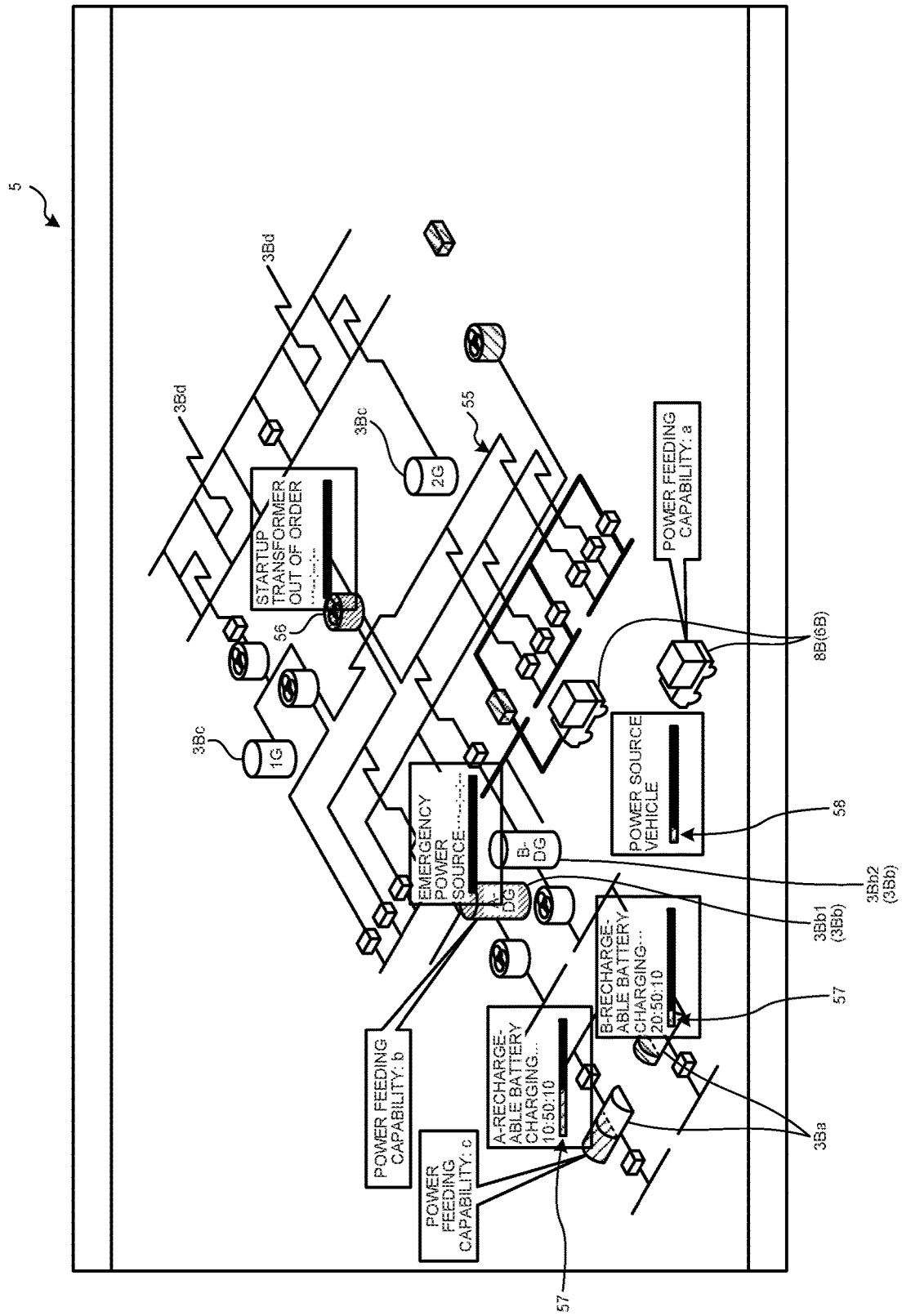
FIG. 10 is a diagram illustrating an example of the display device according to the first embodiment.

As illustrated in FIG. 10, based on the characteristic data on the power sources 50 stored in the storage unit 15, the display device 5 may display thereon the plural power sources 50 (emergency power sources 3Bb, storage battery power source 3Ba, and portable power source 6B) respectively in association with capabilities (power feeding capabilities) of the power sources 50.

The display device 5 may display thereon power feedable time data indicating a time period, over which the storage battery power source 3Ba is able to feed power.

As described above, according to this embodiment, since the operation condition data indicating the operation condition of each of the plural power sources 50 are obtained, and the normal power sources 50 and the abnormal power sources 50 are displayed in different designs, an administrator is able to promptly recognize states of the power sources 50 via the display on the display device 5. Thereby, planning for the power sources 50, such as making a recovery plan for the power sources 50 or a use plan for the operable power sources 50, is able to be carried out appropriately.

Further, in this embodiment, when the power sources 50 include a storage battery power source, remaining capacity data indicating a remaining battery capacity thereof are displayed on the display device 5. Thereby, for example, the power source 50 with a large remaining battery capacity is able to be assigned appropriately.

Further, in this embodiment, the display control unit 18 causes the display device 5 to display thereon each of the plural power sources 50 in association with the capability of that power source 50. Thereby, which of the power sources 50 should be used to supply power is able to be determined promptly.

Further, in this embodiment, based on the necessary power data indicating the power necessary for the electric devices 30 to operate and the characteristic data of each of the plural power sources 50, the power source 50 to be assigned to the electric device 30 is elected and displayed on the display device 5. Thereby, when a specific one of the electric devices 30 is desired to be operated, which of the power sources 50 should be used to supply power thereto is able to be determined promptly.

Further, in this embodiment, the display control unit 18 causes the display device 5 to display thereon the position data indicating the position of the portable power source 6B. Thereby, the position of the portable power source 6B is able to be recognized promptly, and planning for the power sources 50 is able to be carried out appropriately.

In this embodiment, any abnormal power source 50 or abnormal transformer 56 is highlighted in a different design. For example, if abnormality (such as disconnection) occurs in a part of the power source line 55, the display device 5 may identify and display a position in the power source line 55, the position being where that abnormality has occurred. For example, in a display area indicating a portion where disconnection has occurred, a mark, "x", may be displayed.

Second Embodiment

A second embodiment will now be described. In the following description, to components that are the same or equivalent to those of the above described embodiment, the same signs will be appended, and description thereof will be simplified or omitted.

In this embodiment, an example, in which a level of a phenomenon in the plant 1 is determined based on operation condition data on facilities of the plant 1, and display data generated based on a result of the determination are displayed on the display device 5, will be descried.

As described in the first embodiment, in the plant 1, various facilities or devices, such as the power sources 50 or sensors arranged in the nuclear reactor system, are provided. Plant data including operation condition data of these facilities are obtained by the operation condition data obtaining unit 81.

In this embodiment, the determination unit 16 determines, based on the plant data including the operation condition data of the facilities of the plant 1, a level of a phenomenon presumed to occur in the plant 1 due to operation conditions of the facilities. The level of the phenomenon includes a level of damage caused when that phenomenon occurs.

As described above in the first embodiment, based on the plant data, the simulation unit 17 generates scenario data (plant presumption data) indicating the presumed phenomenon of the plant 1. For example, based on the operation condition data on the power sources 50, the simulation unit 17 is able to generate the scenario data of the plant 1.

Based on the scenario data of the plant 1 generated by the simulation unit 17, the determination unit 16 determines the level of the presumed phenomenon in the plant 1.

For example, in a normal state and an abnormal state of the power source 50, phenomena that occur in the plant 1 differ from each other. When any abnormal power source 50 is present, a phenomenon, in which functions of the electric device 30 operated by power supplied from that power source 50 are lost, occurs. Further, if multiple abnormal power sources 50 are present, a phenomenon, in which the number of function losing electric devices 30 of the plural electric devices 30 provided in the plant 1 increases, occurs. Further, when plural abnormal power sources 50 are present, depending on whether these power sources 50 are in an inoperable state or these power sources 50 do operate but are in a state of being unable to output expected power, the phenomenon that occurs in the plant 1 changes.

In the storage unit 15, relation data indicating relations between the operation conditions of the facilities, and phenomena in the plant 1 and levels of the phenomena, are stored in the storage unit 15, the phenomena being presumed to occur due to the operation conditions of the facilities. In this embodiment, relation data indicating relations between operation conditions of the plural power sources 50 and levels of function loss of the electric devices 30 presumed from the operation conditions of these power sources 50 are stored in the storage unit 15. In this embodiment, a level of function loss of the electric devices 30 refers to the number of electric devices 30 that lose their functions. Based on the operation condition data of each of the plural power sources 50 obtained by the operation condition data obtaining unit 81 and the relation data stored in the storage unit 15, the simulation unit 17 estimates the number of electric device 30 that lose their functions, of the plural electric devices 30 provided in the plant 1. Based on the number of electric devices 30 that lose their functions, the number having been estimated based on the operation condition data and the relation data, the determination unit 16 determines the level of the function loss of the electric devices 30.

Figure 11:
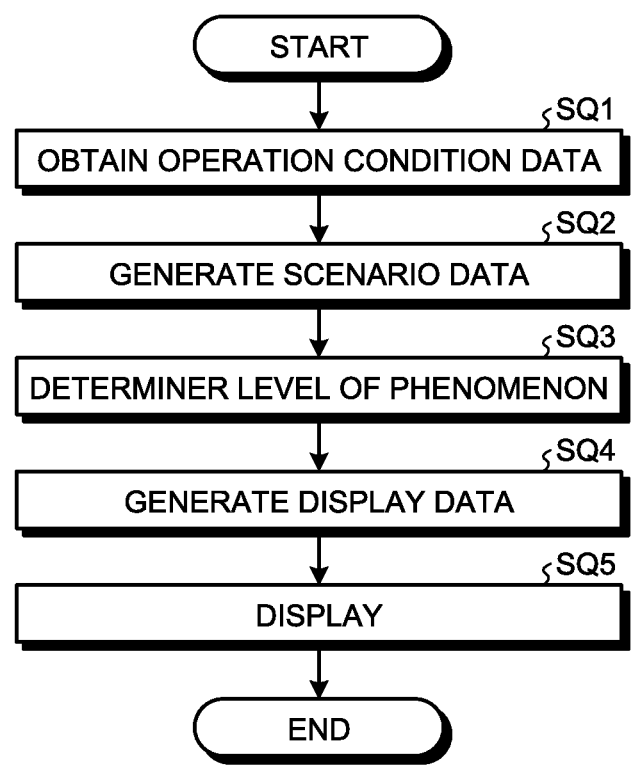
FIG. 11 is a flow chart illustrating an example of a condition determination method according to a second embodiment.

FIG. 11 is a flow chart illustrating an example of a condition determination method for the plant 1 according to this embodiment. The operation condition data obtaining unit 81 obtains operation condition data of each of the plural power sources 50 provided in the plant 1 (Step SQ1).

Based on the operation condition data of each of the plural power sources 50 obtained by the operation condition data obtaining unit 81 and the relation data stored in the storage unit 15, the simulation unit 17 generates scenario data of the plant 1 (Step SQ2).

Based on the scenario data generated by the simulation unit 17, the determination unit 16 determines a level of a phenomenon in the plant 1, the phenomenon being presumed to occur due to those operation conditions of the power sources 50 (Step SQ3). In this embodiment, the determination unit 16 determines, as the level of the phenomenon in the plant 1, the number of electric devices 30 that lose their functions.

The display control unit 18 generates display data based on a result of the determination by the determination unit 16 (Step SQ4). In this embodiment, the display data include the number and positions of the electric devices 30 that lose their functions.

The display control unit 18 causes the display device 5 to display thereon the generated display data (Step SQ5).

As described above, according to this embodiment, by the obtainment of the operation condition data on the facilities, based on the operation condition data, the level (damage level) of the phenomenon presumed to occur due to the operation conditions of the facilities is able to be determined. Thereby, determination of the conditions is able to be carried out promptly.

Further, according to this embodiment, since the relation data indicating the relations between the operation conditions of the facilities and the levels of the phenomena are stored in the storage unit 15, when the operation condition data obtaining unit 81 obtains the operation condition data on the facilities, the determination unit 16 is able to determine the level of the phenomenon, based on the operation condition data on the facilities obtained by the operation condition data obtaining unit 81 and the relation data stored in the storage unit 15. Therefore, determination of the conditions is able to be carried out promptly.

Further, according to this embodiment, based on the determination result by the determination unit 16, the display data are generated and displayed on the display device 5. Thereby, an administrator is able to visually recognize the determination result for the level of the phenomenon.

Third Embodiment

A third embodiment will now be described. In the following description, to components that are the same or equivalent to those of the above described embodiments, the same signs will be appended, and description thereof will be simplified or omitted.

In a condition determination system 10 according to this embodiment, items related to the plant 1 are stored in the storage unit 15 or the database unit 19, the items having been classified into condition levels for respective phenomena corresponding to the items. The determination unit 16 determines whether a condition level has been reached by receiving check results for items of a phenomenon.

The items related to the plant 1 include items of operation conditions of facilities in the plant 1. The check results for the items of the phenomenon include operation condition data of the facilities obtained by the operation condition data obtaining unit 81. In this embodiment, the operation condition data (check results for the items of the phenomenon) include input signals supplied from the sensors provided in the plant 1.

The condition level includes a level of the phenomenon, and includes a level of damage caused when that phenomenon occurs. That is, in this embodiment, in the storage unit 15 or the database unit 19, relation data indicating relations between operation conditions of the facilities and condition levels for the respective phenomena are stored. Based on the operation condition data obtained by the operation condition data obtaining unit 81 (check results for the items of the phenomenon) and the relation data stored in the storage unit 15 or the database unit 19, the determination unit 16 determines whether the phenomenon has reached a prescribed condition level.

Items of operation conditions of the facilities in the plant 1, that is, the items related to the plant 1, are determined beforehand for determination of a condition level of the plant 1. Examples thereof will be illustrated in FIG. 12 to FIG. 14. The items of the operation conditions include "level number", "phenomenon", "phenomenon details", "check item and satisfying requirement thereof", and "input signal and satisfying value thereof".

"Phenomenon" is a phenomenon expected in the plant 1. "Phenomenon details" are detailed contents of the phenomenon.

In this embodiment, the condition levels are classified into three levels, low, intermediate, and high levels. When a phenomenon of the high condition level occurs, damage to the plant 1 is large. When a phenomenon of the low condition level occurs, damage to the plant 1 is comparatively small.

There are plural phenomena, in which damage of the low condition level is expected to be caused; plural phenomena, in which damage of the intermediate condition level is expected to be caused; and plural phenomena, in which damage of the high condition level is expected to be caused. In this embodiment, these plural phenomena are numbered. "Level number" indicates a number of a phenomenon that has been numbered.

"Check item" is an item to be checked in the plant 1. "Satisfying requirement" indicates a requirement, under which "phenomenon" is determined likely to occur. When items checked according to the check items are satisfied, it is determined that "phenomenon" has occurred.

"Input signal" is a signal including operation condition data and supplied from a sensor provided in the plant 1. "Satisfying value" indicates a signal value, at which "phenomenon" is determined likely to occur. When the values of the input signals are satisfied, it is determined that "phenomenon" has occurred.

Figure 12:
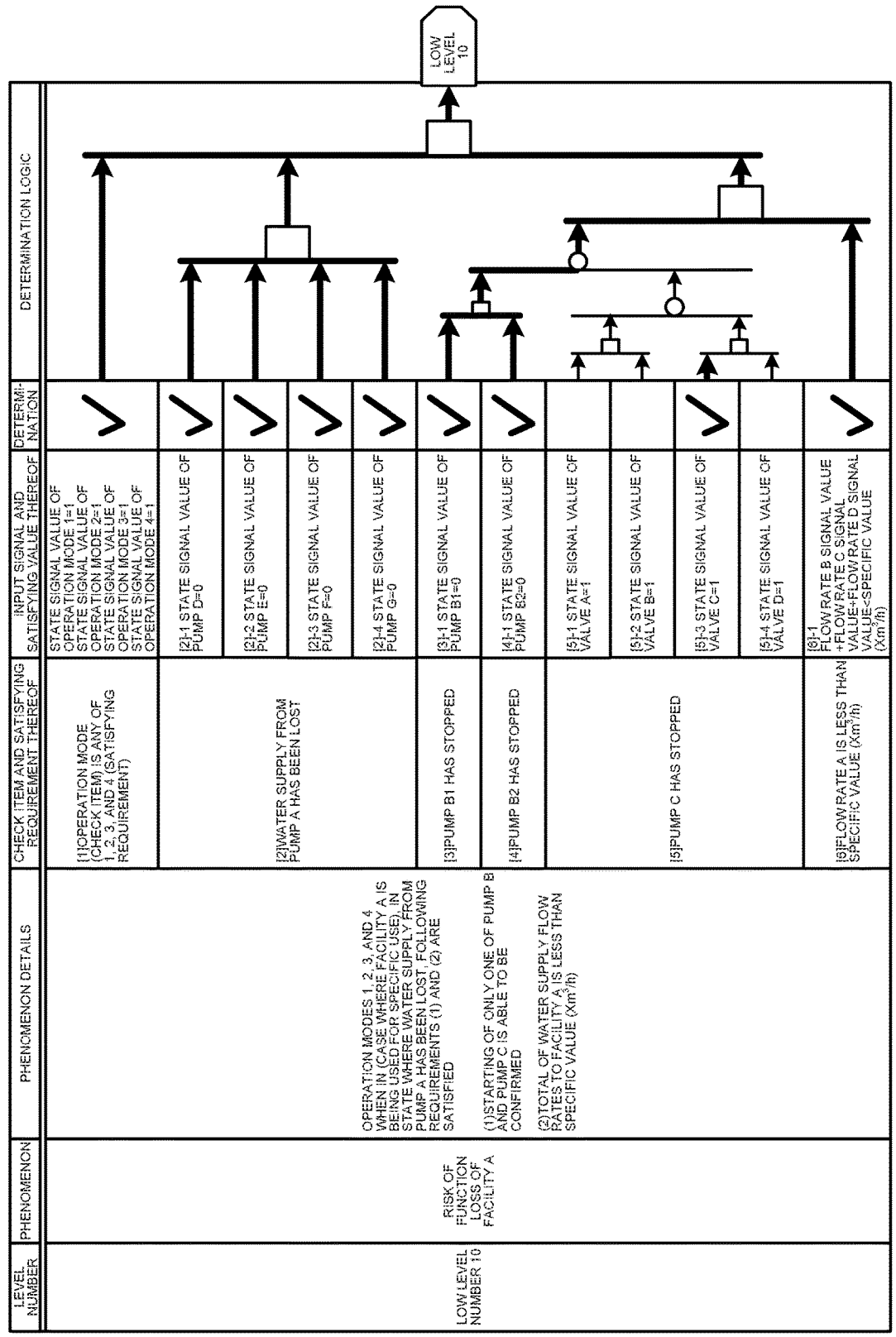
FIG. 12 is a schematic diagram illustrating an example of determination logic of a condition determination system according to a third embodiment.

FIG. 12 illustrates an example, in which the condition level is low, and "number" is "10". A phenomenon of the condition level of "number 10" is "risk of function loss of facility A". Detailed contents of this phenomenon of the condition level of "number 10" are that when a pump A is being used in any of operation modes 1, 2, 3, and 4 for a specific use, in a state where water supply from the pump A has been lost, (1) starting of only one of a pump B and a pump C is able to be confirmed, and (2) a total of water supply flow rates to the pump A is less than a specific value (X m$^3$/h).

Based on whether or not input signals corresponding to the check items are of satisfying values, whether or not the phenomenon has occurred is determined. In the example illustrated in FIG. 12, the following six patterns are present for "check item and satisfying requirement thereof". "Input signal and satisfying value thereof" are set in association with "check item and satisfying requirement thereof".

Check item and satisfying requirement thereof [1]: the operation mode (check item) is any of 1, 2, 3, and 4 (satisfying requirement).

Input signal and satisfying value thereof [1]-1: the state signal value of the operation mode 1=1, or the state signal value of the operation mode 2=1, or the state signal value of the operation mode 3=1, or the state signal value of the operation mode 4=1. The state signal value of each of the operation modes is "1" when the current operation mode is that mode, and is "0" when the current operation mode is not that mode. What kind of states of the facilities and devices the values of the state signal values indicate are prescribed for the respective signals.

Check item and satisfying requirement thereof [2]: water supply from the pump A has been lost.

Input signal and satisfying value thereof [2]-1: the state signal value of a pump D=0. The state signal value of the pump D is "1" in an activated state of the pump, and is "0" in a stopped state of the pump.

Input signal and satisfying value thereof [2]-2: the state signal value of a pump E=0. The state signal value of the pump E is "1" in an activated state of the pump, and is "0" in a stopped state of the pump.

Input signal and satisfying value thereof [2]-3: the state signal value of a pump F=0. The state signal value of the pump F is "1" in an activated state of the pump, and is "0" in a stopped state of the pump.

Input signal and satisfying value thereof [2]-4: the state signal value of a pump G=0. The state signal value of the pump G is "1" in an activated state of the pump, and is "0" in a stopped state of the pump.

Check item and satisfying requirement thereof [3]: a pump B1 has stopped.

Input signal and satisfying value thereof [3]-1: the state signal value of the pump B1=0. The state signal value of the pump B1 is "1" in an activated state of the pump, and is "0" in a stopped state of the pump.

Check item and satisfying requirement thereof [4]: a pump B2 has stopped.

Input signal and satisfying value thereof [4]-1: the state signal value of the pump B2=0. The state signal value of the pump B2 is "1" in an activated state of the pump, and is "0" in a stopped state of the pump.

Check item and satisfying requirement thereof [5]: the pump C has stopped.

Input signal and satisfying value thereof [5]-1: the state signal value of a valve A=1. The state signal value of the valve A is "0" in an open state of the valve, and is "1" in a closed state of the valve.

Input signal and satisfying value thereof [5]-2: a state signal value of a valve B=1. The state signal value of the valve B is "0" in an open state of the valve, and is "1" in a closed state of the valve.

Input signal and satisfying value thereof [5]-3: the state signal value of a valve C=1. The state signal value of the valve C is "0" in an open state of the valve, and is "1" in a closed state of the valve.

Input signal and satisfying value thereof [5]-4: the state signal value of a valve D=1. The state signal value of the valve D is "0" in an open state of the valve, and is "1" in a closed state of the valve.

Check item and satisfying requirement thereof [6]: a flow rate A is less than a specific value (X $m^3/h$).

Input signal and satisfying value thereof [6]-1: a total of a flow rate B signal value, a flow rate C signal value, and a flow rate D signal value is less than the specific value (X $m^3/h$). Each of the signal values of the flow rates B, C, and D is a numerical value of individual continuous quantity.

Operation condition data include an input signal corresponding to a check item. An input signal that is operation condition data of a facility is obtained by the operation condition data obtaining unit 81. The determination unit 16 determines whether or not the input signal obtained by the operation condition data obtaining unit 81 satisfies a satisfying value thereof. If it is determined that the input signal satisfies the satisfying value, a satisfying signal is generated. As illustrated in FIG. 12, a satisfying signal for each satisfied input signal is input to determination logic. When a logic diagram is satisfied up to a right end thereof, the determination unit 16 determines that the phenomenon, "risk of function loss of facility A", of the low level number 10 has occurred. The input signals corresponding to the phenomenon illustrated in FIG. 12 are able to be automatically input to the operation condition data obtaining unit 81 from the sensors provided in the plant 1. The determination unit 16 is able to automatically determine whether or not the phenomenon occurs, based on whether or not the input signals satisfy the satisfying values, and the determination logic. In the determination logic illustrated in FIG. 12, a quadrilateral mark corresponds to a case where all have been satisfied, and a circular mark corresponds to a case where any one of them has been satisfied.

Further, FIG. 13 illustrates an example, in which the condition level is low, and "number" is "31". A phenomenon of the condition level of "number 31" is "risk of function loss of facility B". Detailed contents of this phenomenon of the condition level of "number 31" are that leakage or transpiration of stored water in a facility B has been confirmed, level of stored water in a pit of the facility B (1) level of the stored water in the facility B decreased to be equal to or less than a specific position, and (2) in a state where a low stored water level warning has been transmitted or where there is a risk thereof; a state, in which level of the stored water used is unable to be confirmed with a measuring instrument or visually, has continued for a specific time period or longer.

Based on whether or not input signals corresponding to check items are of satisfying values, whether or not the phenomenon has occurred is determined. In the example illustrated in FIG. 13, the following five patterns are present for "check item and satisfying requirement thereof". "Input signal and satisfying value thereof" are set in association with "check item and satisfying requirement thereof".

Check item and satisfying requirement thereof [1]: stored water leakage detection warning.

Input signal and satisfying value thereof [1]-1: the stored water leakage detection warning signal value=1. When there is a stored water leakage detection warning, the value is "1" and when there is no stored water leakage detection warning, the value is "0".

Check item and satisfying requirement thereof [2]: level of stored water in an a-pit or a b-pit of the facility B is equal to or less than a predetermined range (−Z cm) from a specific position (+Y m).

Input signal and satisfying value thereof [2]-1: the signal value for when the level of the stored water in the a-pit or the b-pit is equal to or less than the predetermined range (−Z cm)=1 (input by an operator). When the level of the stored water is equal to or less than the predetermined range, the value is "1", and when the level of the stored water is above the predetermined range, the value is "0".

Check item and satisfying requirement thereof [3]: transmission of a low stored water level warning for the a-pit or b-bit of the facility B.

Input signal and satisfying value thereof [3]-1: the low stored water level warning signal value for the a-pit=1. When there is a low stored water level warning for the a-pit, the value is "1", and when there is no low stored water level warning for the a-pit, the value is "0".

Input signal and satisfying value thereof [3]-2: the low stored water level warning signal value for the b-pit=1. When there is a low stored water level warning for the b-pit, the value is "1", and when there is no low stored water level warning for the b-pit, the value is "0".

Check item and satisfying requirement thereof [4]: check of water level.

Input signal and satisfying value thereof [4]-1: the signal value for when level of the stored water in the a-pit or b-pit is able to be checked=0 (input by an operator). If the level of the stored water is unable to be checked with a measuring instrument or visually, the value is "1", and if the level of the stored water is able to be checked with a measuring instrument or visually, the value is "0".

Check item and satisfying requirement thereof [5]: setting of a timer for elapse of a predetermined time period from inability to check water level.

Input signal and satisfying value thereof [5]-1: a predetermined time period (for example, one hour), from input of a signal value for when the level of the stored water in the a-pit or b-pit is unable to be checked=1 by an operator, is set.

An input signal that is operation condition data of a facility is obtained by the operation condition data obtaining unit 81. The determination unit 16 determines whether or not the input signal obtained by the operation condition data obtaining unit 81 satisfies the satisfying value. If it is determined that the input signal satisfies the satisfying value, a satisfying signal is generated. As illustrated in FIG. 13, a satisfying signal for each satisfied input signal is input to determination logic. When a logic diagram is satisfied up to a right end thereof, the determination unit 16 determines that the phenomenon, "risk of function loss of facility B", of the low level number 31 has occurred. The input signals corresponding to this phenomenon illustrated in FIG. 13 include input signals automatically input to the operation condition data obtaining unit 81 from the sensors in the plant 1, and input signals input through operation by the operator, and the determination unit 16 is able to semi-automatically make the determination. In the determination logic illustrated in FIG. 13, a quadrilateral mark corresponds to a case where all have been satisfied, and a circular mark corresponds to a case where any one of them has been satisfied.

Figure 14:
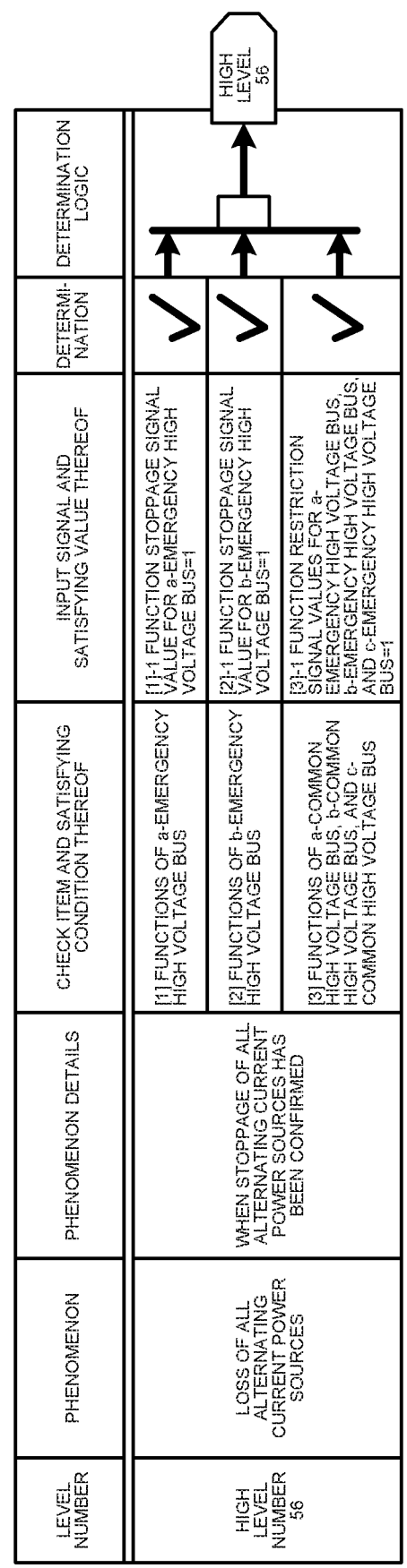
FIG. 14 is a schematic diagram illustrating an example of the determination logic of the condition determination system according to the third embodiment.

Further, FIG. 14 illustrates an example, in which the condition level is high, and "number" is "56". A phenomenon of the condition level of "number 56" is "loss of all alternating current power sources". Detailed contents of this phenomenon of the condition level of "number 56" are that when stoppage of all alternating current power sources of the plant has been confirmed.

Based on whether or not input signals corresponding to check items are of satisfying values, whether or not the phenomenon has occurred is determined. In the example illustrated in FIG. 14, the following three patterns are present for "check item and satisfying requirement thereof". "Input signal and satisfying value thereof" are set in association with "check item and satisfying requirement thereof".

Check item and satisfying requirement thereof [1]: functions of an a-emergency high voltage bus.

Input signal and satisfying value thereof [1]-1: the function stoppage signal value for the a-emergency high voltage bus=1. When the functions of the a-emergency high voltage bus have stopped, the value is "1", and when the functions of the a-emergency high voltage bus have not stopped, the value is "0".

Check item and satisfying requirement thereof [2]: functions of a b-emergency high voltage bus.

Input signal and satisfying value thereof [2]-1: the function stoppage signal value for the b-emergency high voltage bus=1. When the functions of the b-emergency high voltage bus have stopped, the value is "1", and when the functions of the b-emergency high voltage bus have not stopped, the value is "0".

Check item and satisfying requirement thereof [3]: functions of an a-common high voltage bus, a b-common high voltage bus, and a c-common high voltage bus.

Input signal and satisfying value thereof [3]-1: function restriction (decrease in voltage) signal values for the a-common high voltage bus, b-common high voltage bus, and c-common high voltage bus=1. When the functions of the a-common high voltage bus, b-common high voltage bus, and c-common high voltage bus have been restricted, the value is "1", and when the functions of the a-common high voltage bus, b-common high voltage bus, and c-common high voltage bus have not been restricted, the value is "0".

An input signal that is operation condition data of a facility is obtained by the operation condition data obtaining unit 81. The determination unit 16 determines whether or not the input signal obtained by the operation condition data obtaining unit 81 satisfies the satisfying value. If it is determined that the input signal satisfies the satisfying value, a satisfying signal is generated. As illustrated in FIG. 14, a satisfying signal for each satisfied input signal is input to determination logic. When a predetermined period (for example, one hour) has elapsed and a logic diagram has been satisfied up to a right end thereof, the determination unit 16 determines that the phenomenon, "loss of all alternating current power sources", of the high level number 56, has occurred. The input signals corresponding to this phenomenon illustrated in FIG. 14 are input signals input through operation by an operator, and the determination unit 16 makes the determination based on the manual operation by the operator. In the determination logic illustrated in FIG. 14, a quadrilateral mark corresponds to a case where all of the determinations or lower determination logic have/has been satisfied.

After the determination unit 16 determines the condition level of the phenomenon, the display control unit 18 generates, based on the determination result by the determination unit 16, display data as illustrated in FIG. 15, and causes the display device 5 to display thereon the display data. An example of the display illustrated in FIG. 15 is a table, in which respective (low, intermediate, and high) condition levels have been associated with phenomenon numbers; and when a phenomenon has reached a condition level according to a determination result by the determination unit 16, the display control unit 18 executes: black/white inversion of a frame of the corresponding phenomenon number; or display in different colors for the respective types of condition levels (for example, low=green, intermediate=yellow, and high=red).

Further, when a phenomenon has reached a condition level according to a determination result, the information management unit 12 generates report data based thereon. The report data are preferably generated in a standard format so as to be easily understood at a glance. The phenomenon number that has reached the condition level and a time thereof are included in the report data.

In a case where the determination unit 16 executes the above described semi-automatic or manual determination, if there is no input by an operator, input into a frame of the corresponding phenomenon in FIG. 15 is preferably prompted by pop-up display on the display device 5.

In this condition determination system 10, items related to the plant 1 are stored in the storage unit 15 or the database unit 19, the items having been classified into condition levels for respective phenomena corresponding to the items; the data obtaining unit 80 receives check results for the items of the phenomena; the determination unit 16 determines whether a predetermined condition level has been reached; and thereby, the condition determination system 10 is able to determine a condition level as long as the check results for the items of the phenomena that have been stored in the storage unit 15 or the database unit 19 are input. As a result, determination of a condition of the plant is able to be carried out promptly.

Further, in the condition determination system 10 of this embodiment, the display control unit 18 generates, based on a determination result for a condition level of a phenomenon, display data, and causes the display device 5 to display thereon the display data.

The condition determination system 10 enables a determination result for a condition level of each phenomenon to be visually recognized, through display data displayed on the display device 5.

Further, in the condition determination system 10 of this embodiment, if check or determination for items requires human determination, the information management unit 12 prompts the check or determination.

This condition determination system 10 enables delay in human determination to be reduced, and the effect of promptly executing determination of a condition of the plant to be assisted.

In each of the above described embodiments, the operation condition data of the facilities are obtained and the processing is executed. For example, data indicating an abnormal situation, such as "occurrence of an earthquake with an intensity of 6 or larger on the Japanese seven-stage seismic scale", "recognition of emergency", or "occurrence of multiple accidents", may be obtained, and processing may be executed.

Fourth Embodiment

A fourth embodiment will now be described. In the following description, to components that are the same or equivalent to those of the above described embodiments, the same signs will be appended, and description thereof will be simplified or omitted.

Figure 16:
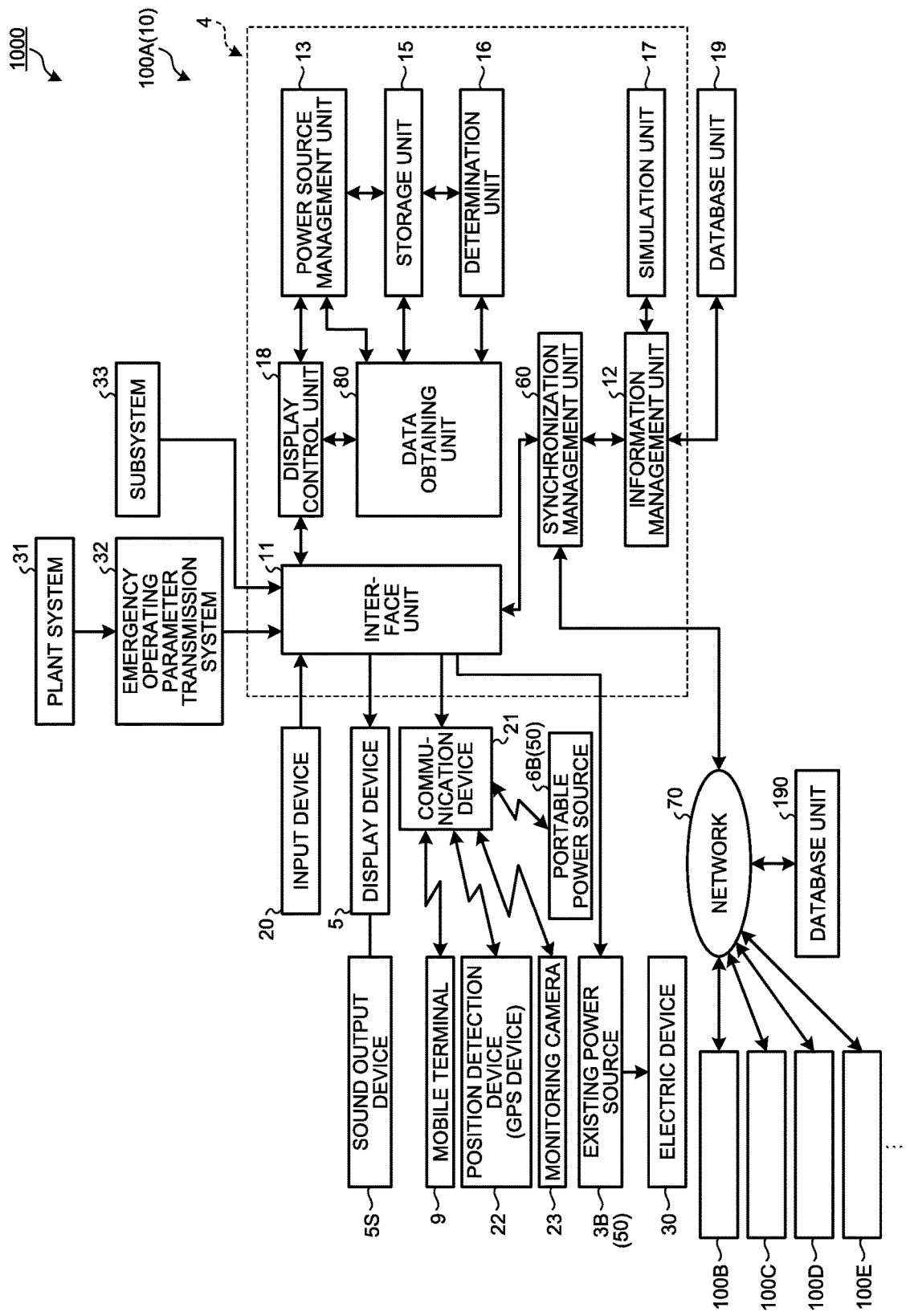
FIG. 16 is a diagram illustrating an example of a decision-making support system according to a fourth embodiment.

FIG. 16 is a diagram illustrating an example of a decision-making support system 100 according to this embodiment. The decision-making support system 100 supports decision-making for measures at the time of abnormality.

As illustrated in FIG. 16, plural decision-making support system 100A, decision-making support system 100B, decision-making support system 100C, decision-making support system 100D, and decision-making support system 100E are connected to one another to be able to communicate data via a network 70. A comprehensive nuclear reactor disaster network is constructed of the plural decision-making support systems (100A, 100B, 100C, 100D, and 100E) connected via the network 70. The network (comprehensive nuclear reactor disaster network) 70 is a comprehensive network utilized at the time of a disaster related to a nuclear reactor. Each of the plural decision-making support systems (100A, 100B, 100C, 100D, and 100E) has a configuration equivalent to that of the decision-making support system 100 described in the above embodiments. FIG. 16 illustrates an example, in which five decision-making support systems (100A, 100B, 100C, 100D, and 100E) are provided. Any number of decision-making support systems may be connected via the network 70.

The decision-making support system 100A is arranged in, for example, a nuclear power plant. The decision-making support system 100B is arranged in, for example, a power company. The decision-making support system 100C is arranged in, for example, a relevant department of a municipality. The decision-making support system 100D is arranged in, for example, a relevant department of a nation. The nation includes at least one of a government policy organization, a regulation agency, and an off-site center. The decision-making support system 100E is arranged in, for example, a plant maker.

In the following description, when the plural decision-making support systems (100A, 100B, 100C, 100D, and 100E) do not need to be distinguished from one another, they will simply be referred to as the decision-making support systems 100.

In this embodiment, each of the plural decision-making support systems 100 has a synchronization management unit 60. The synchronization management unit 60 is connected to each of the interface unit 11 and the information management unit 12. The synchronization management unit 60 is connected to the network 70. The synchronization management unit 60 of one decision-making support system 100 of the plural decision-making support systems 100 shares data with the synchronization management units 60 of the other decision-making support systems 100. The synchronization management unit 60 executes transmission and reception of data, and update of data, through the network 70.

Further, the synchronization management unit 60 of one of the decision-making support systems 100 executes update of data, based on data received from the synchronization management unit 60 of another one of the decision-making support systems 100, when the one of the decision-making support systems 100 is reconnected to the network 70 after a predetermined time period has elapsed from disconnection thereof from the network 70. The plural decision-making support systems 100 are able to share data with one another via the network 70.

In this embodiment, a database unit 190 connected to the network 70 is provided. The plural decision-making support systems 100 share data with the database unit 190 via the network 70.

The information management unit 12 causes the display control unit 18 to generate display data, based on abnormality data that are necessary at the time of abnormality. The abnormality data include data necessary for decision-making. The information management unit 12 shares the abnormality data via the network 70. That is, the information management unit 12 of one decision-making support system 100 of the plural decision-making support systems 100 shares the abnormality data with the information management units 12 of the other decision-making support systems 100. The information management unit 12 executes transmission and reception of the abnormality data, and update of the abnormality data, through the network 70.

The abnormality data include the following data.
(1) Manpower resource management information: input from the input device 20
(2) Logistic support (transportation of supplies) information: input from the input device 20
(3) Radiation monitoring (periphery, in-plant, and in-building) information: input from monitoring posts via the network 70
(4) Meteorological information, wind direction information, earthquake information, and tsunami information: input via the network 70
(5) Condition of damage in plant (camera images, landslip, and restoration condition) information: input from the input device 20, the mobile terminal 9, and the monitoring camera 23, via the interface unit 11
(6) Plant reactor core information (fuel temperature, in-reactor temperature, in-reactor pressure, and the like): input from the emergency operating parameter transmission system 32
(7) Progress presumption information on plant condition: input from the simulation unit 17
(8) Power transmission information around plant: input from the power company via the network 70
(9) In-plant response condition (condition of portable facility) information: input from the input device 20
(10) Information on materials with liability to preserve, such as nuclear reactor design drawings: input from the database unit 190 via the network 70
(11) Task management information: input from the input device 20
(12) Facsimile image information and the like: input from the input device 20

In this embodiment, the information management unit 12 selects abnormality data necessary for decision-making, from plural sets of abnormality data, and causes the display control unit 18 to generate display data by use of the selected abnormality data. The information management unit 12 of one of the decision-making support systems 100 shares the display data with the other decision-making support systems 100 via the network 70.

The plural decision-making support systems (100A, 100B, 100C, 100D, and 100E) are respectively arranged at different related places. The related places include the nuclear power plant, the power company, the municipality, the nation, and the plant maker. Abnormality data that are required for decision making by the respective decision-making support systems (100A, 100B, 100C, 100D, and 100E) are usually different from one another.

In this embodiment, the information management unit 12 of each of the plural decision-making support systems (100A, 100B, 100C, 100D, and 100E) selects, based on predetermined priority of abnormality data, a set of abnormality data with high priority, from the plural sets of abnormality data, and causes the display control unit 18 to generate display data by use of the selected set of abnormality data.

The selected set of abnormality data includes latest data. The latest data include realtime data. Abnormality data are input to the information management unit 12 in real time. The database unit 190 executes storage thereof by association with a time, at which the abnormality data were input. The information management unit 12 causes the display control unit 18 to generate display data by use of the latest data. The display device 5 displays thereon the display data generated by use of the latest data.

The selected set of abnormality data includes abnormality data fulfilling a priority display standard. The abnormality data fulfilling the priority display standard include abnormality data with a high risk and abnormality data with high importance. The information management unit 12 causes the display control unit 18 to generate display data by use of the abnormality data fulfilling the priority display standard. The display device 5 displays thereon the display data generated by use of the abnormality data fulfilling the priority display standard.

The abnormality data fulfilling the priority display standard include, for example, plant data that have changed with a change rate exceeding a reference value that is determined beforehand in the plant 1. The plant data include, for example, fuel temperature data indicating fuel temperature that has changed with a change rate exceeding a predetermined reference value, in-reactor temperature data indicating in-reactor temperature that has changed with a change rate exceeding a reference value, and in-reactor pressure data indicating in-reactor pressure that has changed with a change rate exceeding a reference value. The display device 5 displays thereon the display data generated based on the plant data including these fuel temperature data, in-reactor temperature data, and in-reactor pressure data.

The abnormality data fulfilling the priority display standard include, for example, peripheral data (meteorological data and the like) that have changed with a change rate exceeding a predetermined reference value. The peripheral data include, for example, rainfall data indicating amount of rainfall that has changed with a change rate exceeding a predetermined reference value, wind speed data indicating wind speed that has changed with a change rate exceeding a reference value, and seismic intensity data indicating seismic intensity that has changed with a change rate exceeding a reference value. The display device 5 displays thereon display data generated based on the peripheral data including these rainfall data, wind speed data, and seismic intensity data.

The abnormality data fulfilling the priority display standard may include data supplied from a predetermined organization (for example, the nation).

When causing the display device 5 to display thereon the display data generated based on the abnormality data fulfilling the priority display standard, the information management unit 12 may cause the display device 5 to highlight the display data based on priority (importance) thereof. As described already by reference to FIG. 5, this highlighting includes, for example, pop-up display, by which the display data are displayed so as to pop up.

The information management unit 12 may cause the display control unit 18 to generate display data that have been organized into items of measures, based on abnormality data necessary for decision-making. The display device 5 displays thereon the organized display data. The items of measures include the following items.

(1) Time of evacuation
(2) Evacuation route
(3) Evacuation site
(4) Operation procedure
(5) Personnel assignment
(6) Operator route
(7) Power source route
(8) Types and numbers of transported supplies The database unit 190 stores therein plural sets of abnormality data. The information management unit 12 selects a set of abnormality data necessary for decision on items of respective measures, from the plural sets of abnormality data stored in the database unit 190, and causes the display control unit 18 to generate display data by use of the selected set of abnormality data. The display device 5 displays thereon the display data.

The selected set of abnormality data include presumption data generated by estimation calculation of change in abnormality data over time. The simulation unit 17 generates plant presumption data by executing estimation calculation of change in plant data collected by the information management unit 12 over time. The information management unit 12 causes the display control unit 18 to generate display data by use of the plant presumption data generated by the simulation unit 17. The display device 5 displays thereon the display data.

If a severe accident occurs in the plant 1, the information management unit 12 obtains necessary plant data (abnormality data) from the plant system 31. Further, the information management unit 12 obtains necessary peripheral data (abnormality data) from the subsystem 33. Furthermore, the information management unit 12 obtains various types of abnormality data via the network 70.

Based on the obtained abnormality data, the information management unit 12 causes the display control unit 18 to generate display data. The information management unit 12 may cause the display control unit 18 to generate display data by processing information input from the input device 20. The display device 5 displays thereon the generated display data.

In this embodiment, the decision-making support system 100 includes the condition determination system 10 described in the above described embodiments. The abnormality data include plant data, such as the operation condition data of the power sources 50. Thereby, the related places are able to share the data related to the power sources 50 in the plant 1.

As described above, according to this embodiment, the decision-making support system 100 includes the condition determination system 10, and the information management unit 12 that shares abnormality data necessary at the time of emergency (at the time of abnormality) via the network 70. The abnormality data include plant data, such as the operation condition data of the power sources 50. Thereby, since the abnormality data including the operation condition data are shared by the related places, decision-making is able to be effectively supported by use of the abnormality data.

Further, in the condition determination system 10 of this embodiment, the information management unit 12 is configured to be able to share information with the related places via the network 70, generates report data based on the condition level of the phenomenon, and distributes the report data to the respective places via the network 70.

The condition determination system 10 enables the respective places to be notified of the determination result for the condition level of the phenomenon promptly by notifying the respective places of the report data via the network 70, and the related places to deal with the condition level urgently.

In the above described embodiment, the decision-making support systems 100 are applied to a nuclear power plant. The decision-making support systems 100 may be applied to at least one of a thermal power plant, a chemical plant, and an environmental plant.

The decision-making support systems 100 may be applied, not only to disasters in plants, but also to disasters caused in urban areas by natural phenomena, such as earthquakes, typhoons, and tsunamis. Further, the decision-making support systems 100 may be applied to disasters, such as airplane falls and missile attacks.

In the above described embodiments, the decision-making support systems 100 are used when an accident or a disaster actually occurs. The decision-making support systems 100 may be applied to a drill for preparation for an accident or a disaster, the drill being carried out in the plant 1. The decision-making support systems 100 may be applied to a drill for preparation for an accident or a disaster, the drill being carried out in the nation or a local public organization.

That is, in the above described embodiments, emergency or abnormality is a concept including: abnormal operation of the plant 1; occurrence of an accident; occurrence of a disaster; and a drill supposing occurrence of an accident or a disaster.

Fifth Embodiment

A fifth embodiment will now be described. In the following description, to components that are the same or equivalent to those of the above described embodiments, the same signs will be appended, and description thereof will be simplified or omitted.

In the above described embodiments, the decision-making support system 100 including the condition determination system 10 is applied to a plant facility. The condition determination system 10 may be applied to any of various application targets, including, not only plant facilities, but also, for example, transportation facilities, such as expressways or railways, building facilities, such as apartment facilities or commercial facilities; and the like.

For example, a transportation facility has plural traffic lights and a power supply source for operating the traffic lights. Normally, the traffic lights are operated by power supplied from a power line installed by a power company. Further, the traffic lights are equipped with power sources for emergency. At the time of a power failure when power supply from the power line has stopped, the traffic lights are operated by power supplied from the power sources. The plural traffic lights are respectively equipped with the power sources. The transportation facility has the plural power sources that supply power respectively to the plural traffic lights.

For example, at the time of a disaster (at the time of abnormality), a power source that loses its function may be generated. The condition determination system 10 obtains operation condition data indicating an operation condition of each of the plural power sources, and causes the display device 5 to display thereon normal power sources that have not lost their functions and abnormal power sources that have lost their functions, in different designs.

Further, in a normal state and an abnormal state of a power source, phenomena that occur in the transportation facility differ from each other. When any abnormal power source is present, a phenomenon, in which functions of a traffic light operated by power supplied from that power source are lost, occurs. Further, when multiple abnormal power sources are present, a phenomenon, in which the number of traffic lights that lose their functions is increased among the plural traffic lights provided in the transportation facility, occurs. Furthermore, when plural abnormal power sources are present, depending on whether these power sources are in an inoperable state or these power sources do operate but are in a state of being unable to output expected power, the phenomenon that occurs in the transportation facility changes. Further, when functions of a traffic light are lost due to an abnormal power source, a phenomenon, in which a traffic jam is caused, may occur. Based on the operation condition data of the power sources, the determination unit 16 is able to determine a level (damage level) of a phenomenon that occurs in the transportation facility due to the operation conditions of the power sources.

For the transportation facility also, by the procedure described by reference to FIG. 11, a level of a phenomenon that occurs in the transportation facility due to the operation conditions of the power sources is able to be determined. The operation condition data obtaining unit 81 obtains the operation condition data of each of the plural power sources provided in the transportation facility.

Based on the operation condition data of each of the plural power sources obtained by the operation condition data obtaining unit 81 and relation data stored in the storage unit 15, the simulation unit 17 generates scenario data of the transportation facility.

Based on the scenario data generated by the simulation unit 17, the determination unit 16 determines a level of a phenomenon in the transportation facility presumed to occur due to the operation conditions of the power sources. In this embodiment, the determination unit 16 determines the number of traffic lights that lose their functions, as a phenomenon level of the transportation facility.

Based on a result of the determination by the determination unit 16, the display control unit 18 generates display data. In this embodiment, the display data include the number and positions of the traffic lights that lose their functions.

The display control unit 18 causes the display device 5 to display thereon the generated display data.

Figure 17:
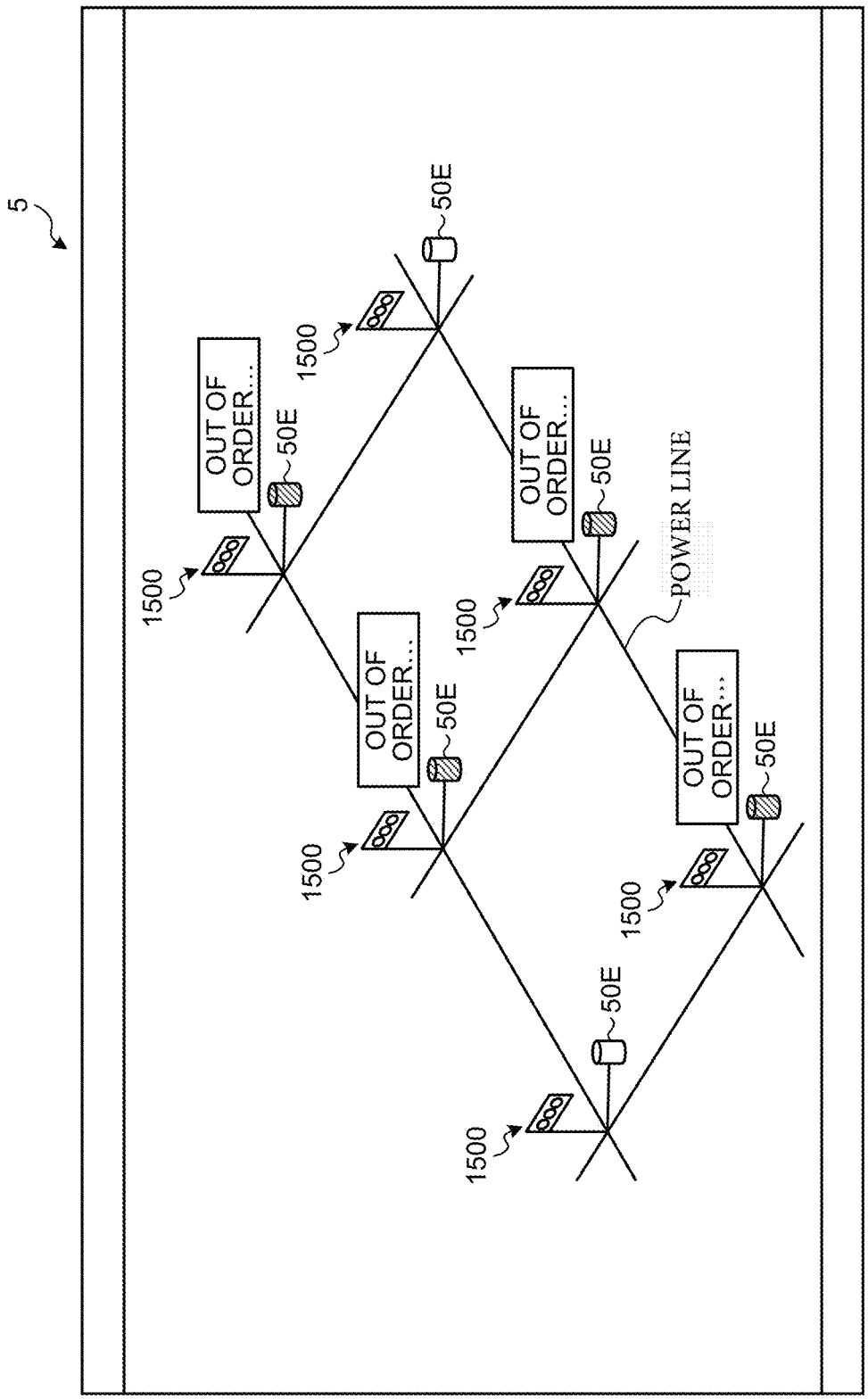
FIG. 17 is a schematic diagram illustrating an example of display of a condition determination system of a fifth embodiment.

FIG. 17 illustrates an example of display on the display device 5 according to this embodiment. As illustrated in FIG. 17, the transportation facility has plural traffic lights 1500. Normally, the traffic lights 1500 are operated by power supplied from a power line installed by a power company. At the time of a power failure, the traffic lights 1500 are operated by power supplied from power sources 50E that the traffic lights 1500 are equipped with.

At the time of a disaster (at the time of abnormality), functions of some power sources 50E of the plural power sources 50E may be lost. The condition determination system 10 obtains operation condition data indicating an operation condition of each of the plural power sources 50E, and causes the display device 5 to display thereon normal power sources 50E that have not lost their functions and abnormal power sources 50E that have lost their functions, in different designs.

Abnormality data fulfilling a priority display standard like those described in the fourth embodiment above include, for example, facility data that have changed with a change rate exceeding a reference value that is determined beforehand in the transportation facility or an oil and gas facility. As for the transportation facility, the facility data include, for example, rainfall data indicating amount of rainfall that has changed with a change rate exceeding a predetermined reference value, wind speed data indicating wind speed that has changed with a change rate exceeding a reference value, river water level data indicating river water level that has changed with a change rate exceeding a reference value, and snowfall data indicating amount of snowfall that has changed with a change rate exceeding a reference value. As for the oil and gas facility, for example, temperature data indicating facility temperature that has changed with a change rate exceeding a reference value, and pressure data indicating facility pressure that has changed with a change rate exceeding a reference value are included. The display device 5 displays thereon display data generated based on these data.

The above described processing by the condition determination system 10 according to the embodiments above may be realized by a computer program to be executed by a computer. For example, a computer program provided from a server or the like may be installed in the above described computer system 4, and the computer system 4 may execute the above described processing according to the computer program.

Figure 18:
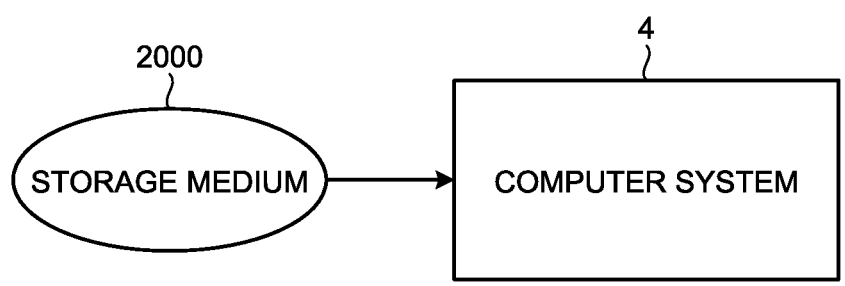
FIG. 18 is a diagram illustrating an example of a storage medium according to the embodiments.

Further, as illustrated in FIG. 18, the computer program may be recorded in a storage medium 2000, and the computer system 4 may be caused to read that computer program and implement the above described processing. As the storage medium 2000, any of various types of media, such as: a storage medium that optically, electrically, or magnetically records therein information, like a CD-ROM, a flexible disk, or a magneto-optical disk; or a semiconductor memory that electrically records therein information, like a ROM or a flash memory, may be used.

Although the embodiments have been described in detail above, the present invention is not to be limited to the above described embodiments, and may be modified or changed variously within the scope stated in the claims.

REFERENCE SIGNS LIST

1 PLANT
2 CONSTRUCTION
2A FIRST CONSTRUCTION
2B SECOND CONSTRUCTION
3 EXISTING DEVICE
3A EXISTING PUMP
3B EXISTING POWER SOURCE
3Ba STORAGE BATTERY POWER SOURCE
3Bb EMERGENCY POWER SOURCE
3Bc INTERNAL POWER SOURCE
3Bd EXTERNAL POWER SOURCE
4 COMPUTER SYSTEM
5 DISPLAY DEVICE
5A MAIN SCREEN
5B SUBSCREEN
5Ba SUBSCREEN
5Bb SUBSCREEN
5S SOUND OUTPUT DEVICE
6 PORTABLE DEVICE
6A PORTABLE PUMP
6B PORTABLE POWER SOURCE
7 VEHICLE
7A VEHICLE
7B VEHICLE
8 DEVICE VEHICLE
8A PUMP VEHICLE
8B POWER SOURCE VEHICLE
9 MOBILE TERMINAL
10 POWER SOURCE PLANNING SYSTEM
11 INTERFACE UNIT (DATA OBTAINING UNIT)
12 INFORMATION MANAGEMENT UNIT
13 POWER SOURCE MANAGEMENT UNIT
15 STORAGE UNIT
17 SIMULATION UNIT
18 DISPLAY CONTROL UNIT
19 DATABASE UNIT
20 INPUT DEVICE
21 COMMUNICATION DEVICE
22 POSITION DETECTION DEVICE
23 MONITORING CAMERA
30 ELECTRIC DEVICE
31 PLANT SYSTEM
32 EMERGENCY OPERATING PARAMETER TRANSMISSION SYSTEM
33 SUBSYSTEM
50 POWER SOURCE
50E POWER SOURCE
55 POWER SOURCE LINE
56 TRANSFORMER
57 BAR
58 BAR
60 SYNCHRONIZATION MANAGEMENT UNIT
70 NETWORK
100 DECISION-MAKING SUPPORT SYSTEM
100A DECISION-MAKING SUPPORT SYSTEM
100B DECISION-MAKING SUPPORT SYSTEM
100C DECISION-MAKING SUPPORT SYSTEM
100D DECISION-MAKING SUPPORT SYSTEM
100E DECISION-MAKING SUPPORT SYSTEM
190 DATABASE UNIT
1000 MANAGEMENT SYSTEM
1500 TRAFFIC LIGHT
2000 STORAGE MEDIUM

The invention claimed is:

1. A condition determination system, comprising:
a storage unit configured to store therein relation data indicating a relation between an operation condition of a facility and a level of a phenomenon that occurs due to the operation condition of the facility; and
at least one processor programed to function as:
an operation condition data obtaining unit configured to obtain operation condition data indicating the operation condition of the facility, the facility having existing power sources including an external power source and at least one of an internal power source, an emergency power source, or a storage battery power source;
a simulation unit configured to estimate change over time of the facility and generate scenario data by using the operation condition data and the relation data, the scenario data indicating a presumed phenomenon that is presumed to occur due to the operation condition of the facility;

a determination unit configured to determine, based on the scenario data, a level of the presumed phenomenon; and a display control unit configured to generate display data based on the determined level of the presumed phenomenon, and cause a display device to display thereon the display data, wherein the at least one processor is programed to function as the determination unit to determine, among the existing power sources, normal power sources and abnormal power sources based on the operation condition data, and the display control unit to generate, in response to determining the normal power sources and the abnormal power sources, a first display data representing the normal power sources and a second display data representing the abnormal power sources, and to cause the display device to display the first display data and the second display data differently from each other, wherein
the existing power sources are configured to supply power to electric devices in the facility,
the storage unit is configured to store
power data of each of the electric devices, the power data indicating a power value necessary for each of the electric devices, and
characteristic data of each of the existing power sources, the characteristic data indicating a power feeding capability of each of the existing power sources,
the at least one processor is programed to function as
the determination unit to determine that, in response to the power feeding capability of one of the existing power sources being smaller than the power value of one of the electric devices connected to the one of the existing power sources, the one of the electric devices is unable to operate,
the determination unit to determine, as the level of the presumed phenomenon, the number of electric devices that are unable to operate,
the display control unit to generate a third display data indicating the number of the electric devices that are unable to operate and to cause the display device to display the third display data, and
the determination unit to determine, based on the number of the electric devices that are unable to operate, a level of function loss of the electric devices that are unable to operate, and
the at least one processor is programed to function as
the display control unit to cause the display device to display each of the existing power sources in association with the power feeding capability of the corresponding existing power source,
a power source management unit to elect, based on the power data and the characteristic data, a power source of the existing power sources to be assigned to an electric device among the electric devices, and
the display control unit to cause the display device to display an image indicating a power source line connecting to the elected power source to the electric device.

2. The condition determination system according to claim 1, wherein the at least one processor is programed to function as the operation condition data obtaining unit to obtain the operation condition data of each of plural facilities,
the determination unit to classify, based on plural sets of operation condition data, the plural facilities into normal facilities and abnormal facilities, and
the display control unit to cause the display device to display thereon the normal facilities and abnormal facilities in different designs.

3. The condition determination system according to claim 2, wherein
the facilities include the storage battery power source,
the operation condition data include remaining capacity data indicating a remaining battery capacity of the storage battery power source, and
the at least one processor is programed to function as the display control unit to cause the display device to display thereon the remaining capacity data.

4. The condition determination system according to claim 2, wherein
the facilities include the storage battery power source,
the operation condition data include power feedable time data indicating a time period, over which the storage battery power source is able to feed power, and
the at least one processor is programed to function as the display control unit to cause the display device to display thereon the power feedable time data.

5. The condition determination system according to claim 2, wherein
the facilities include the existing power sources, and a portable power source that substitutes for the existing power sources,
the at least one processor is programed to function as a position data obtaining unit to obtain position data indicating a position of the portable power source, and
the at least one processor is programed to function as the display control unit to cause the display device to display thereon the position data.

6. The condition determination system according to claim 5, wherein
the portable power source includes a storage battery power source, and
the at least one processor is programed to function as the display control unit to cause the display device to display thereon remaining battery capacity data indicating a remaining battery capacity of the storage battery power source of the portable power source.

7. The condition determination system according to claim 5, wherein
the portable power source includes a storage battery power source, and
the at least one processor is programed to function as the display control unit to cause the display device to display thereon power feedable time data indicating a time period, over which the storage battery power source of the portable power source is able to feed power.

8. A decision-making support system, comprising:
the condition determination system according to claim 1; and
a further processor programed to function as an information management unit configured to share, via a network, abnormality data including the operation condition data necessary at a time of abnormality,
wherein
the decision-making support system is configured to support decision-making for measures at the time of abnormality.

9. The decision-making support system according to claim 8, wherein the further processor is programed to function as the information management unit to distribute report data generated based on the determined level of the presumed phenomenon.

10. A condition determination method, including:
- storing, in a storage unit, relation data indicating a relation between an operation condition of a facility and a level of a phenomenon that occurs due to the operation condition of the facility;
- obtaining operation condition data indicating the operation condition of the facility, the facility having existing power sources including an external power source and at least one of an internal power source, an emergency power source, or a storage battery power source;
- estimating change over time of the facility and generating scenario data by using the operation condition data and the relation data, the scenario data indicating a presumed phenomenon that is presumed to occur due to the operation condition of the facility;
- determining, based on the scenario data, a level of the presumed phenomenon; and
- generating, based on the determined level of the presumed phenomenon, display data, and causing a display device to display thereon the display data,
- wherein the condition determination method further comprises:
  - determining, among the existing power sources, normal power sources and abnormal power sources based on the operation condition data, and
  - generating, in response to determining the normal power sources and the abnormal power sources, a first display data representing the normal power sources and a second display data representing the abnormal power sources, and causing the display device to display the first display data and the second display data, wherein the first and second display data are displayed differently from each other on the display device,
- wherein the existing power sources supply power to electric devices in the facility,
- wherein the condition determination method further comprises
  - storing
    - power data of each of the electric devices, the power data indicating a power value necessary for each of the electric devices, and
    - characteristic data of each of the existing power sources, the characteristic data indicating a power feeding capability of each of the existing power sources,
  - determining that, in response to the power feeding capability of one of the existing power sources being smaller than the power value of one of the electric devices connected to the one of the existing power sources, the one of the electric devices is unable to operate,
  - determining, as the level of the presumed phenomenon, the number of electric devices that are unable to operate,
  - generating a third display data indicating the number of the electric devices that are unable to operate and causing the display device to display the third display data, and
  - determining, based on the number of the electric devices that are unable to operate, a level of function loss of the electric devices that are unable to operate, and
- wherein the condition determination method further comprises:
  - causing the display device to display each of the existing power sources in association with the power feeding capability of the corresponding existing power source,
  - electing, based on the power data and the characteristic data, a power source of the existing power sources to be assigned to an electric device among the electric devices, and
  - causing the display device to display an image indicating a power source line connecting to the elected power source to the electric device.

* * * * *